United States Patent
Beneventi et al.

(10) Patent No.: US 12,188,212 B2
(45) Date of Patent: Jan. 7, 2025

(54) AUTOMATIC SHUTOFF VALVE FOR BREAKAWAY WET BARREL FIRE HYDRANT

(71) Applicants: Alan D. Beneventi, San Diego, CA (US); John G. Polifka, San Diego, CA (US)

(72) Inventors: Alan D. Beneventi, San Diego, CA (US); John G. Polifka, San Diego, CA (US)

( * ) Notice: Subject to any disclaimer, the term of this patent is extended or adjusted under 35 U.S.C. 154(b) by 75 days.

(21) Appl. No.: 18/219,532

(22) Filed: Jul. 7, 2023

(65) Prior Publication Data

US 2023/0349134 A1  Nov. 2, 2023

Related U.S. Application Data

(63) Continuation-in-part of application No. 17/835,721, filed on Jun. 8, 2022, now Pat. No. 11,725,368, which
(Continued)

(51) Int. Cl.
| | |
|---|---|
| *E03B 9/04* | (2006.01) |
| *F16K 17/40* | (2006.01) |
| *F16L 55/10* | (2006.01) |
| *F16K 15/03* | (2006.01) |
| *F16K 17/36* | (2006.01) |
| *F16K 31/46* | (2006.01) |

(52) U.S. Cl.
CPC .............. *E03B 9/04* (2013.01); *F16K 17/406* (2013.01); *F16L 55/1007* (2013.01); *F16K 15/033* (2013.01); *F16K 15/038* (2013.01); *F16K 17/36* (2013.01); *F16K 31/46* (2013.01)

(58) Field of Classification Search
CPC .......... E03B 9/04; F16K 17/406; F16K 17/36; F16K 15/033; F16K 15/038; F16K 31/46; F16L 55/1007
USPC ......... 137/451, 68.14, 272, 291, 292, 382.5, 137/797; 251/305, 298
See application file for complete search history.

(56) References Cited

U.S. PATENT DOCUMENTS

| | | | |
|---|---|---|---|
| 4,127,142 A | 11/1978 | Snider | |
| 4,230,148 A * | 10/1980 | Ogle, Jr. ............... | F16K 15/033 137/527 |

(Continued)

OTHER PUBLICATIONS

"J6000 Series Break Check. Industry-Leading Infrastructure Protection", brochure by Jones Mueller Brand, 2020 (2 pages).
(Continued)

*Primary Examiner* — Minh Q Le
(74) *Attorney, Agent, or Firm* — Gavrilovich, Dodd & Lindsey LLP

(57) ABSTRACT

An automatic shutoff valve for breakaway wet barrel fire hydrant is disclosed. In general, one aspect disclosed features an apparatus comprising: a valve housing comprising a valve body, a flange, and a valve seat; a valve pedal configured to engage the valve seat and prevent fluid flow through the valve seat in a closed position, and to permit fluid flow through the valve seat in an open position; a lockout tab disposed within the valve body, wherein the lockout tab maintains the valve pedal in the open position; a lockout bar disposed distally from the valve body; and an activation rod mechanically coupled to the lockout bar and configured to keep the valve pedal engaged with the lockout tab.

20 Claims, 35 Drawing Sheets

Related U.S. Application Data is a continuation of application No. 17/692,986, filed on Mar. 11, 2022, now Pat. No. 11,377,826.

(56) References Cited

U.S. PATENT DOCUMENTS

| | | | |
|---|---|---|---|
| 4,867,199 A * | 9/1989 | Marx | F16K 15/035 137/512.1 |
| 5,609,179 A | 3/1997 | Knapp | |
| 6,401,745 B1 | 6/2002 | Corder | |
| 7,128,083 B2 | 10/2006 | Fleury et al. | |
| 7,267,136 B2 | 9/2007 | Fleury et al. | |
| 8,991,415 B1 | 3/2015 | Luppino | |
| 9,353,878 B2 | 5/2016 | Plummer et al. | |
| 9,551,330 B2 | 1/2017 | Drube | |
| 10,407,882 B2 | 9/2019 | Kitchen et al. | |
| 10,648,581 B2 * | 5/2020 | Jaśkiewicz | F16K 27/0209 |
| 10,767,775 B2 | 9/2020 | Huelsman | |
| 11,156,303 B2 | 10/2021 | Allen et al. | |
| 2005/0224114 A1 | 10/2005 | Cook et al. | |
| 2015/0240962 A1 | 8/2015 | Plummer et al. | |
| 2016/0084393 A1 * | 3/2016 | Barone | F16K 15/038 137/527 |
| 2016/0265197 A1 | 9/2016 | Kitchen et al. | |
| 2017/0307097 A1 | 10/2017 | Plummer | |
| 2018/0023714 A1 * | 1/2018 | Reszewicz | F16K 15/038 137/512 |
| 2018/0171606 A1 | 6/2018 | Kitchen et al. | |
| 2020/0256474 A1 | 8/2020 | Huelsman | |
| 2020/0326001 A1 | 10/2020 | Plummer | |
| 2021/0293340 A1 * | 9/2021 | Allen | F16K 15/038 |
| 2022/0390037 A1 | 12/2022 | Allen et al. | |

OTHER PUBLICATIONS

Non-Final Office Action dated Apr. 22, 2022, issued in related U.S. Appl. No. 17/692,986 (9 pages).

Notice of Allowance mailed May 18, 2022, issued in related U.S. Appl. No. 17/692,986 (7 pages).

Non-Final Office Action dated Oct. 14, 2022, issued in related U.S. Appl. No. 17/835,721 (9 pages).

Notice of Allowance mailed Mar. 22, 2023, issued in related U.S. Appl. No. 17/835,721 (8 pages).

* cited by examiner

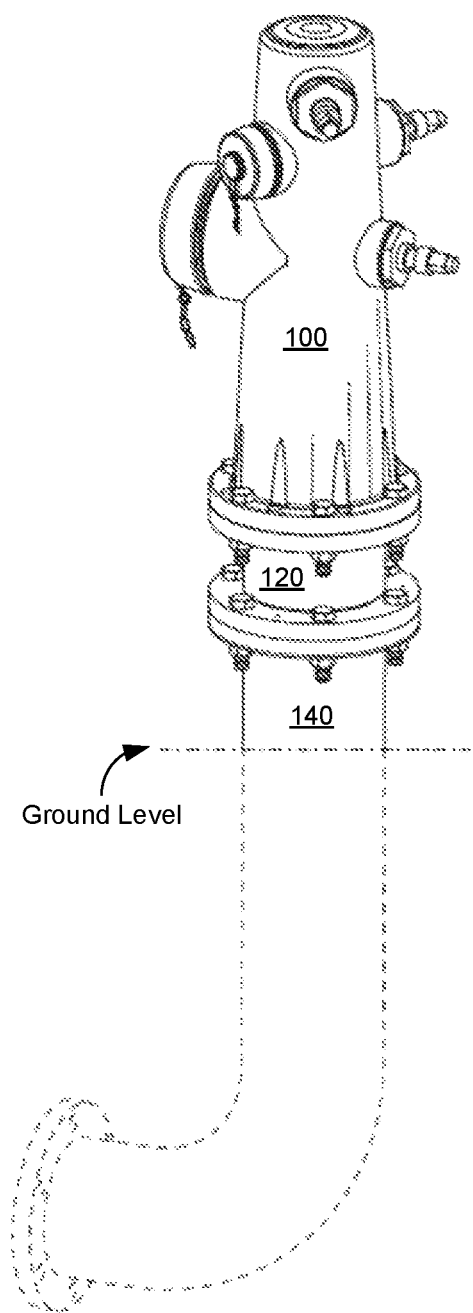
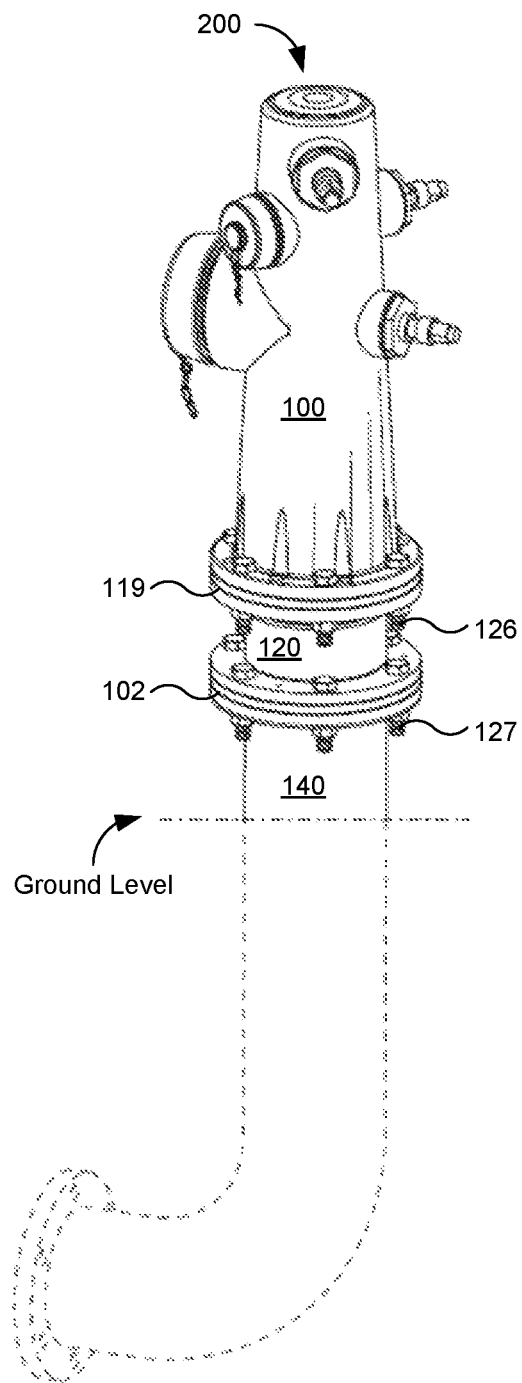
FIG. 1
FIG. 2

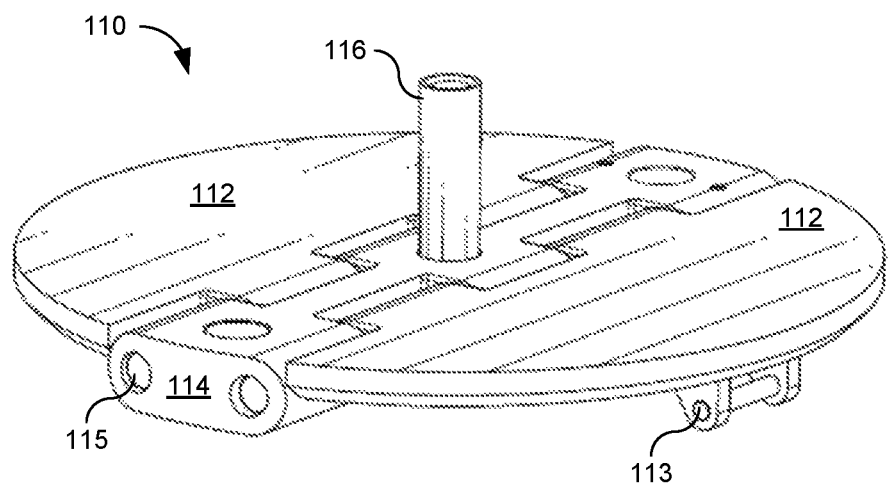
FIG. 28
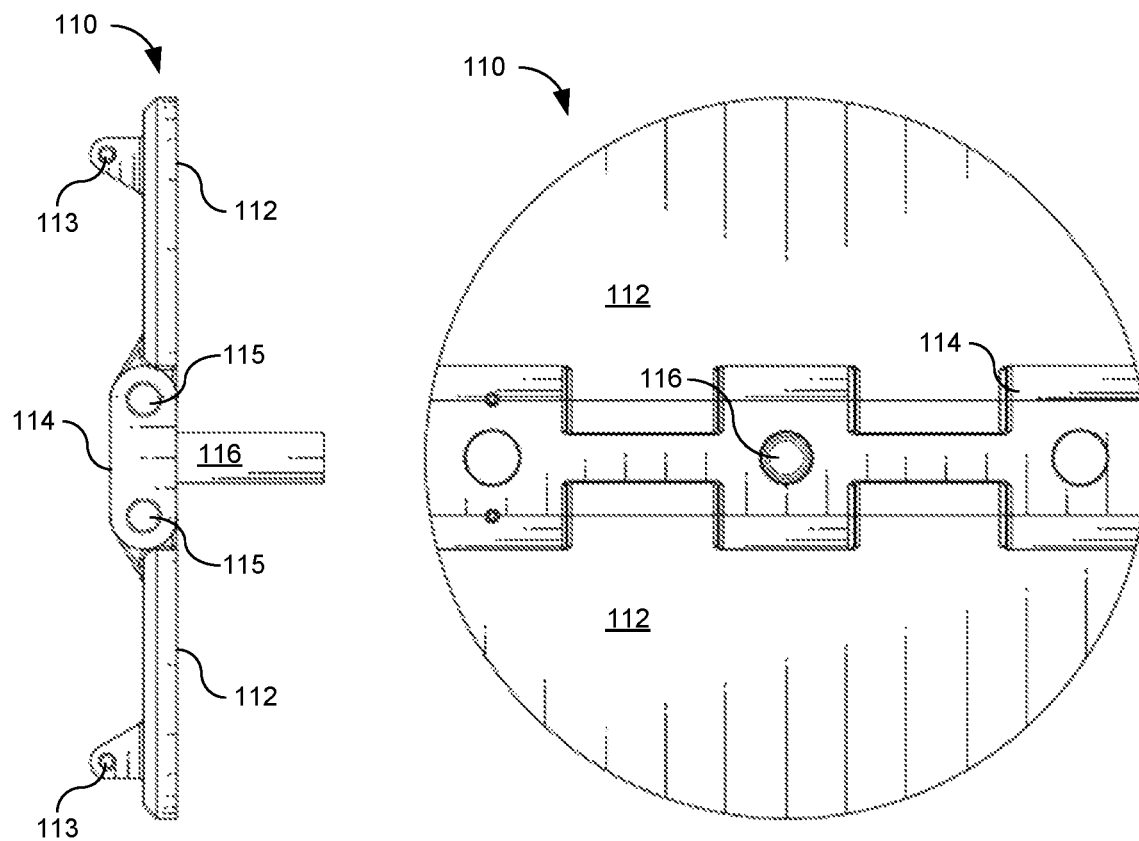
FIG. 29
FIG. 30

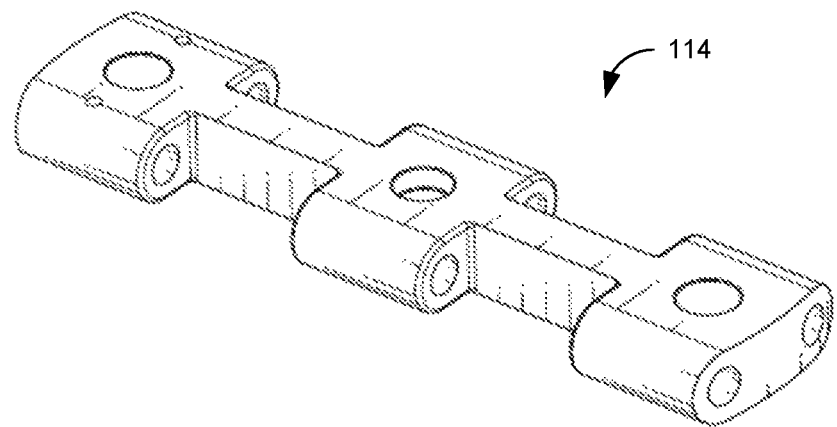
FIG. 38
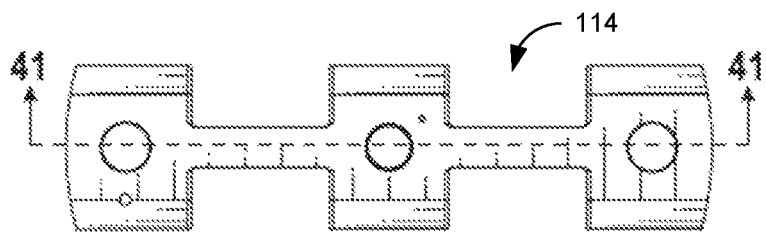
FIG. 39
FIG. 40
FIG. 41
FIG. 42

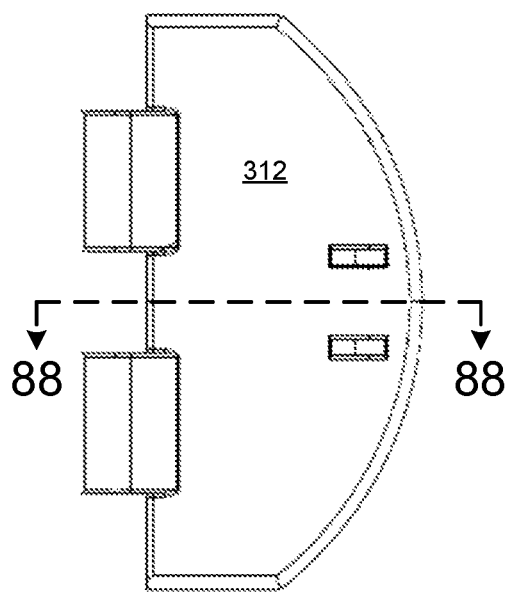
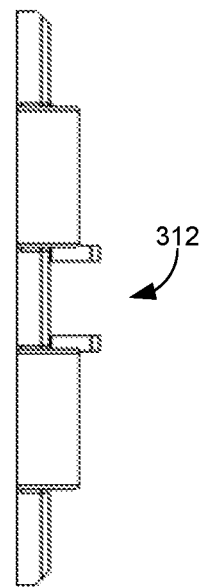
FIG. 85
FIG. 86
FIG. 87
FIG. 88

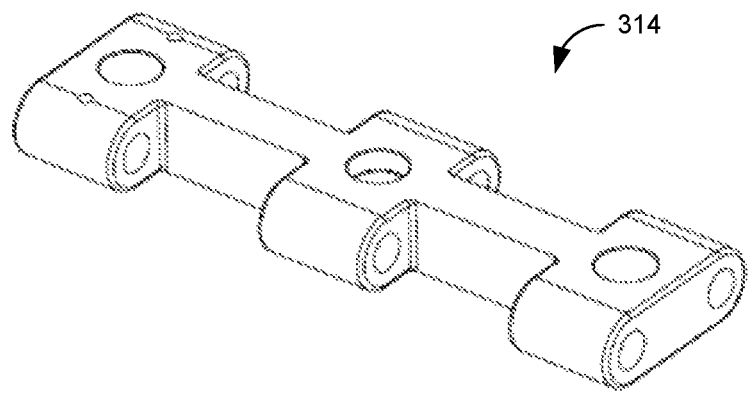
FIG. 89
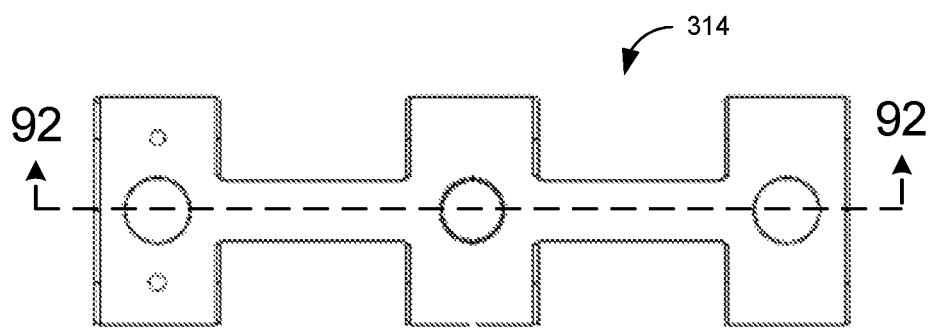
FIG. 90
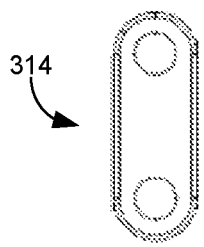
FIG. 91
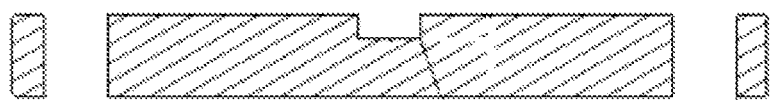
FIG. 92 FIG. 93

AUTOMATIC SHUTOFF VALVE FOR BREAKAWAY WET BARREL FIRE HYDRANT

CROSS REFERENCE TO RELATED APPLICATIONS

The present application is a continuation-in-part of U.S. patent application Ser. No. 17/835,721, filed Jun. 8, 2022, entitled "AUTOMATIC SHUTOFF VALVE FOR BREAKAWAY WET BARREL FIRE HYDRANT," which is a continuation of U.S. patent application Ser. No. 17/692,986, filed Mar. 11, 2022, now U.S. Pat. No. 11,377,826, entitled "AUTOMATIC SHUTOFF VALVE FOR BREAKAWAY WET BARREL FIRE HYDRANT," the disclosures thereof incorporated by reference herein in their entirety.

DESCRIPTION OF RELATED ART

The disclosed technology relates generally to fire hydrants, and more particularly some embodiments relate shutoff valves for fire hydrants.

SUMMARY

In general, one aspect disclosed features an apparatus comprising: a valve housing comprising a valve body, a flange, and a valve seat; a valve pedal configured to engage the valve seat and prevent fluid flow through the valve seat in a closed position, and to permit fluid flow through the valve seat in an open position; a lockout tab disposed within the valve body, wherein the lockout tab maintains the valve pedal in the open position; a lockout bar disposed distally from the valve body; and an activation rod mechanically coupled to the lockout bar and configured to keep the valve pedal engaged with the lockout tab.

Embodiments of the apparatus may include one or more of the following features. In some embodiments, the valve body is configured to be disposed within a fluid supply pipe, and the flange is configured to mate with a flange of the fluid supply pipe. In some embodiments, when the activation rod is not present, the valve pedal disengages from the lockout tab, and a flow of fluid passing the valve pedal moves the valve pedal from the open position to the closed position. Some embodiments comprise a spring configured to urge the valve pedal away from the lockout tab; wherein, when the activation rod is not present, the spring causes the valve pedal to disengage from the lockout tab, and a flow of fluid passing the valve pedal moves the valve pedal from the open position to the closed position. Some embodiments comprise a collar disposed between the lockout bar and the valve body. In some embodiments, the collar is a breakaway collar. Some embodiments comprise a hydrant, wherein the collar is secured to the hydrant by a breakaway collar. Some embodiments comprise a valve slide slidably mounted within the valve body, wherein the valve pedal is pivotally mounted to the valve slide, and wherein the activation rod is configured to press the slide toward the lockout tab; and a spring configured to urge the valve slide away from the lockout tab. Some embodiments comprise a bottom saddle comprising the lockout tab, wherein the bottom saddle is fixedly mounted within the valve body. Some embodiments comprise a lockout ring disposed distally from the valve body, the lockout ring comprising the lockout bar. Some embodiments comprise a spring configured to urge the valve pedal from the open position toward the closed position.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1 illustrates a conventional fire hydrant installation.

FIG. 2 illustrates a fire hydrant installation according to some embodiments of the disclosed technologies.

FIG. 28 is an isometric view of the flapper assembly of the main body assembly according to some embodiments of the disclosed technologies.

FIG. 29 is a side view of the flapper assembly according to some embodiments of the disclosed technologies.

FIG. 30 is a top view of the flapper assembly according to some embodiments of the disclosed technologies.

FIG. 38 is an isometric view of the slide of the flapper assembly according to some embodiments of the disclosed technologies.

FIG. 39 is a top view of the slide according to some embodiments of the disclosed technologies.

FIG. 40 is a side view of the slide according to some embodiments of the disclosed technologies.

FIG. 41 is a cutaway view of the slide of FIG. 39 according to some embodiments of the disclosed technologies.

FIG. 42 illustrates the pin securing the flapper to the slide according to some embodiments of the disclosed technologies.

FIG. 43 is an isometric view of the slide pin according to some embodiments of the disclosed technologies.

FIG. 85 is a bottom view of the pedal according to some embodiments of the disclosed technologies.

FIG. 86 is a side view of the pedal according to some embodiments of the disclosed technologies.

FIG. 87 is a side view of the pedal according to some embodiments of the disclosed technologies.

FIG. 88 is a cutaway view of the pedal of FIG. 85 according to some embodiments of the disclosed technologies.

FIG. 89 is an isometric view of the slide of the flapper assembly according to some embodiments of the disclosed technologies.

FIG. 90 is a top view of the slide according to some embodiments of the disclosed technologies.

FIG. 91 is a side view of the slide according to some embodiments of the disclosed technologies.

FIG. 92 is a cutaway view of the slide of FIG. 39 according to some embodiments of the disclosed technologies.

FIG. 93 illustrates the pin of the slide of the flapper assembly according to some embodiments of the disclosed technologies.

The figures are not exhaustive and do not limit the present disclosure to the precise form disclosed.

DETAILED DESCRIPTION

Fire hydrants form a critical part of our infrastructure by providing an on-demand supply of water to firefighters. But occasionally fire hydrants are damaged, for example in collisions with automobiles. In such accidents the hydrant is usually removed from its riser entirely, resulting in a large discharge of water. This high-pressure flow presents a direct danger to persons nearby. The large volume of water discharged often floods nearby streets, businesses, and homes. The economic devastation from these floods is significant.

Furthermore, stopping the discharge of water from the riser is non-trivial. The shutoff valve is generally located underground at some distance from the riser. The valve cover must be located and unearthed before it can be operated to stop the discharge. Sometimes the valve cover has accidently been covered over with asphalt during routine street maintenance and must be located by using street plans and instinct or more usual, is the use of a metal detector in 6 inches to 2 feet of water to pin point the exact location of the valve cover. The valve is 3 to 6 feet below the street level grade. Once the cover is removed, then the 6-inch diameter pipe valve shaft is filled with water, making it very cumbersome and difficult to lower the 6 ft tall valve key, into the flooded shaft, and must engage the top of the gate valve in order to begin the valve shutoff process. The number of turns required to shut off a gate valve is about 20 to 30 rotations by two firemen. Street intersections must be closed during this time; sometimes this process takes hours, by which time the volume of water discharged is in the thousands of gallons lost into the street storm drains, and the resulting damage is extensive to the municipality infrastructure and private property.

Embodiments of the present disclosure provide automatic shutoff valve for breakaway wet barrel fire hydrants. These hydrants are designed to break away when struck by a vehicle or the like, generally through the use of a breakaway collar, breakaway bolts, or both. According to these embodiments, when the hydrant breaks away, an activation rod causes a valve assembly to shut, thereby stopping the discharge of water. The valve assembly is designed to fit within the existing main water supply riser. This feature makes the valve assembly ideal for retrofitting existing hydrants.

The disclosed technology is described in terms of fire hydrants and water. But as will be readily apparent to one skilled in the art, this technology is readily applicable to other valves and other fluids.

Figure 57:
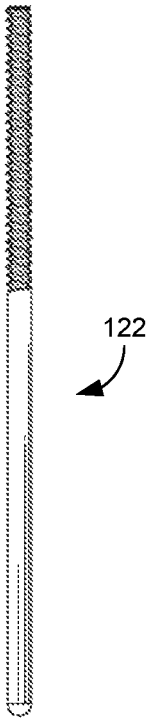
FIG. 57 is a side view of the activation rod according to some embodiments of the disclosed technologies.

FIGS. 2-57 illustrate a first embodiment of an automatic shutoff valve for breakaway wet barrel fire hydrant. A list of parts shown in the drawings of the first embodiment is presented below, along with example materials, quantities and dimensions. However, it should be understood that various embodiments of the disclosed technology may be implemented with more or fewer parts, with other materials and dimensions, and combinations thereof.

Hydrant 100, qty 1
Water shutoff valve assembly 101
Main body assembly 102, qty 1
Main body 103, may be stainless steel 304, qty 1
Bottom saddle 104, may be stainless steel 304, qty 1
Side slide pin 105, qty 2
Compression spring 106, stainless steel, qty 2
Slotted spring pin 107, qty 2
Countersunk screws 108, stainless steel, may be ¹⁰⁄₃₂", qty 4
Seal 109, may be ¹⁄₁₆" rubber sheet, may be bonded, qty 4
Flapper assembly 110, qty 1
Pedal assembly 111, qty 2
Pedal 112, qty 2
Dowel pin 113, qty 2
Slide 114, may be stainless steel 304, qty 1
Pin 115, may be 0.25" DIA×5.2" LONG, qty 2
Slide pin 116, qty 1
Slotted spring pin 117, qty 2
Lockout plate 119, may be stainless steel 304, qty 1
Break off collar 120, qty 1
Countersunk screws 121, may be ¹⁰⁄₃₂", qty 6
Activation rod 122, qty 1
Washer 123, may be ¼", qty 2
Nut 124, may be ¼", qty 2

Lock washer 125, may be ¼", qty 2
Breakaway bolt 126, with nuts, qty 6
Bolt 127, with nuts, qty 6
Riser 140
Retention tabs 204, qty 2
Valve seat 206

FIG. 1 illustrates a conventional fire hydrant installation. FIG. 2 illustrates a fire hydrant installation 200 according to some embodiments of the disclosed technologies. Referring to FIG. 2, portions of the main body assembly 102 and lockout plate 119 are visible. In some embodiments, breakaway bolts 126 and nuts 127 are used to secure the lockout plate 119 between the hydrant 100 and the breakoff collar 120. This arrangement allows the hydrant to break away cleanly, at the bolts 126, at the breakoff collar 120, or both. An alternative breakoff collar implementation is shown in FIGS. 60-63. Either implementation of the breakoff collar may be used with any of the disclosed embodiments.

Figure 3:
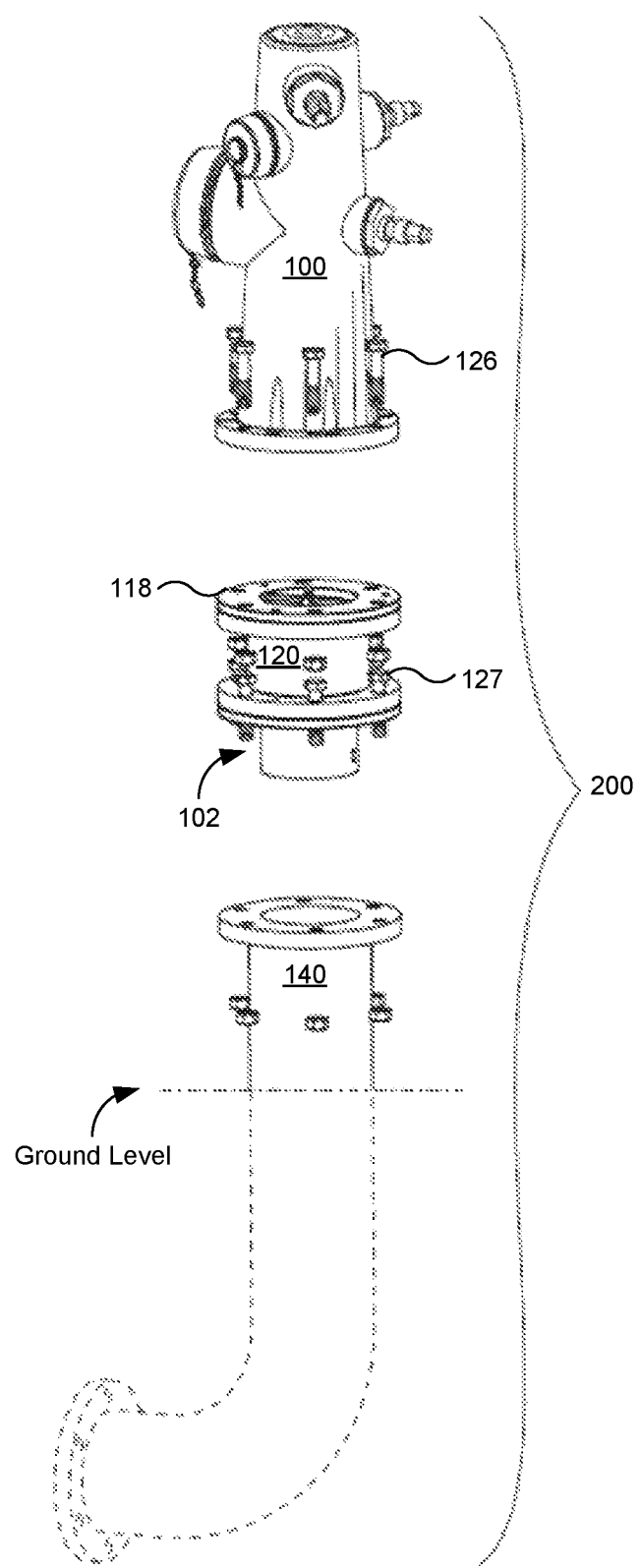
FIG. 3 illustrates components of the fire hydrant installation of FIG. 2 according to some embodiments of the disclosed technologies.

FIG. 3 illustrates components of the fire hydrant installation 200 of FIG. 2 according to some embodiments of the disclosed technologies.

Figure 4:
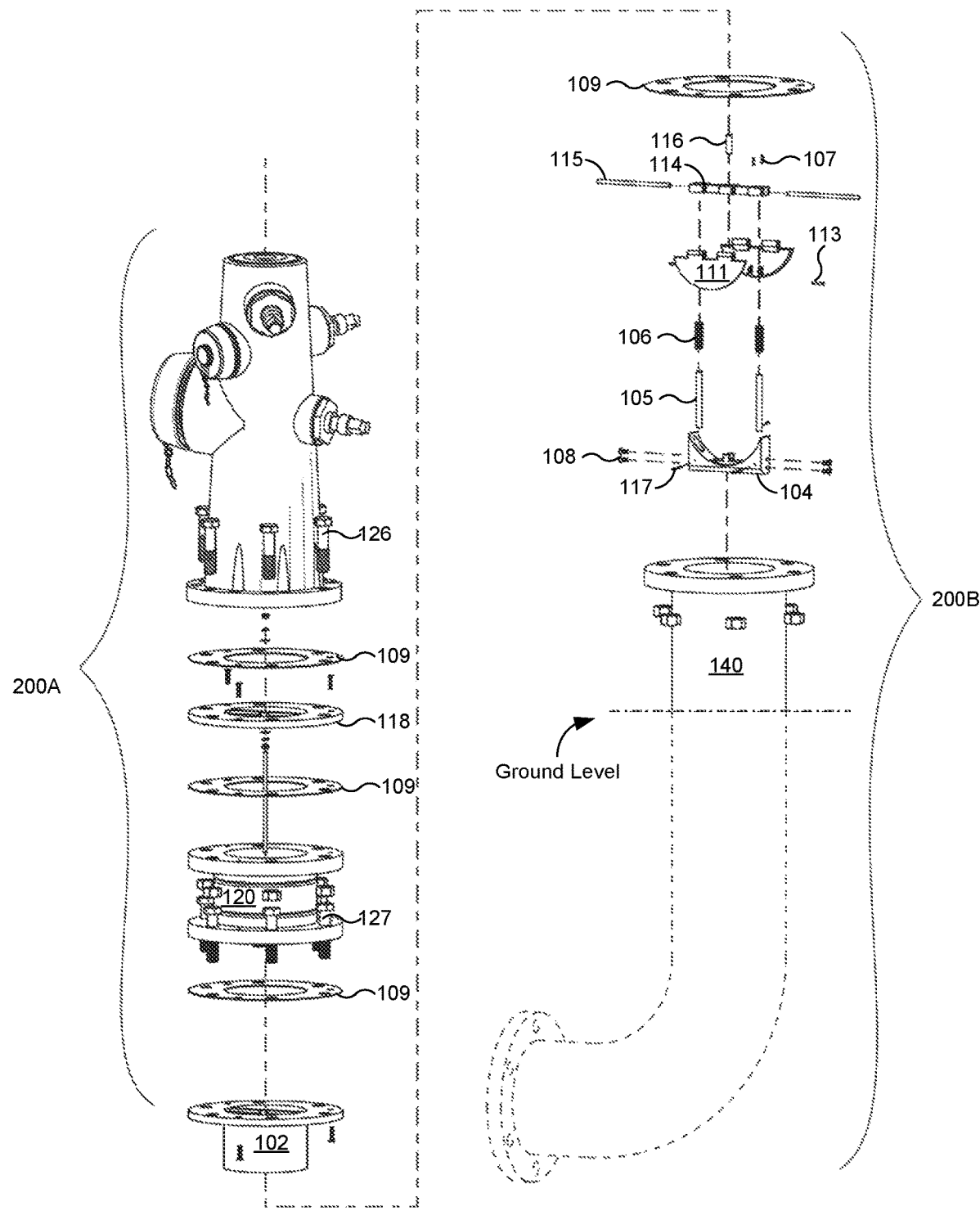
FIG. 4 is an exploded view of the fire hydrant installation of FIG. 2 according to some embodiments of the disclosed technologies.

FIG. 4 is an exploded view of the fire hydrant installation 200 of FIG. 2 according to some embodiments of the disclosed technologies.

Figure 5:
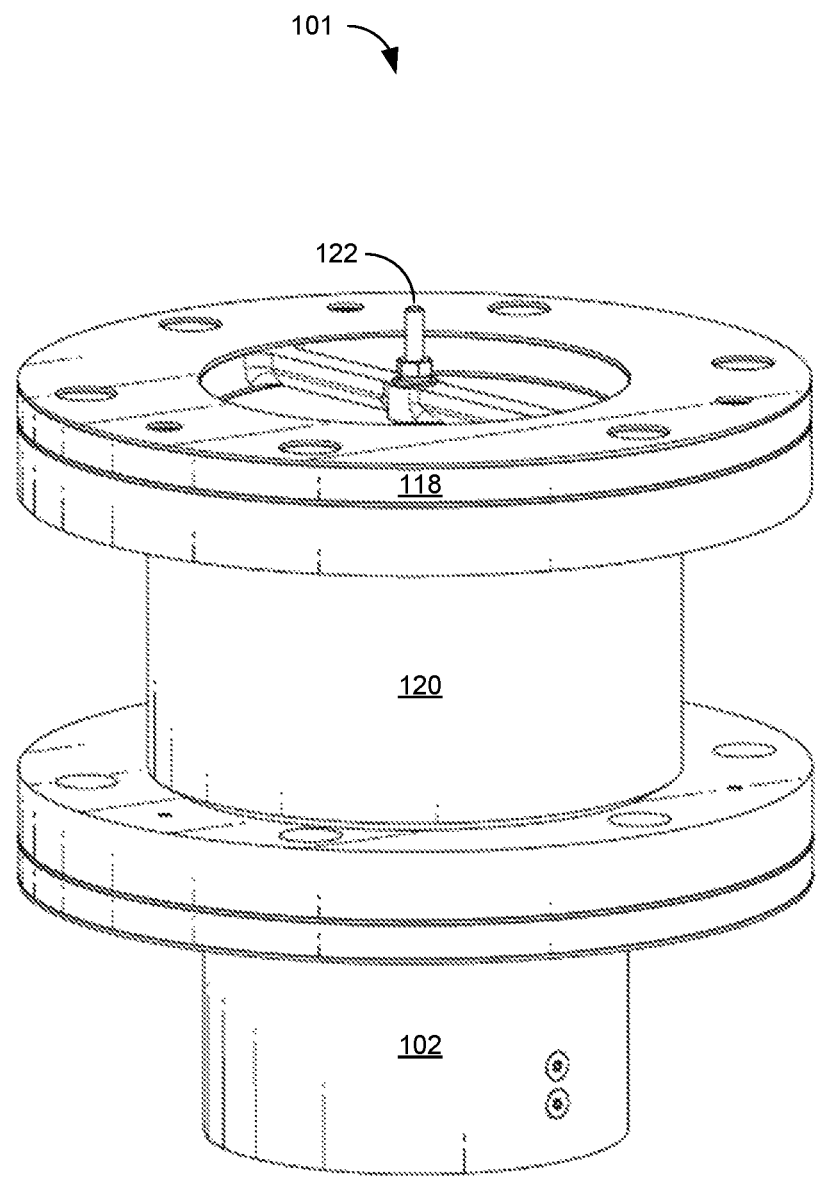
FIG. 5 illustrates the water shutoff valve assembly of FIG. 4 according to some embodiments of the disclosed technologies.

FIG. 5 illustrates the water shutoff valve assembly 101 and breakoff collar 120 of FIG. 4 according to some embodiments of the disclosed technologies.

Figure 6:
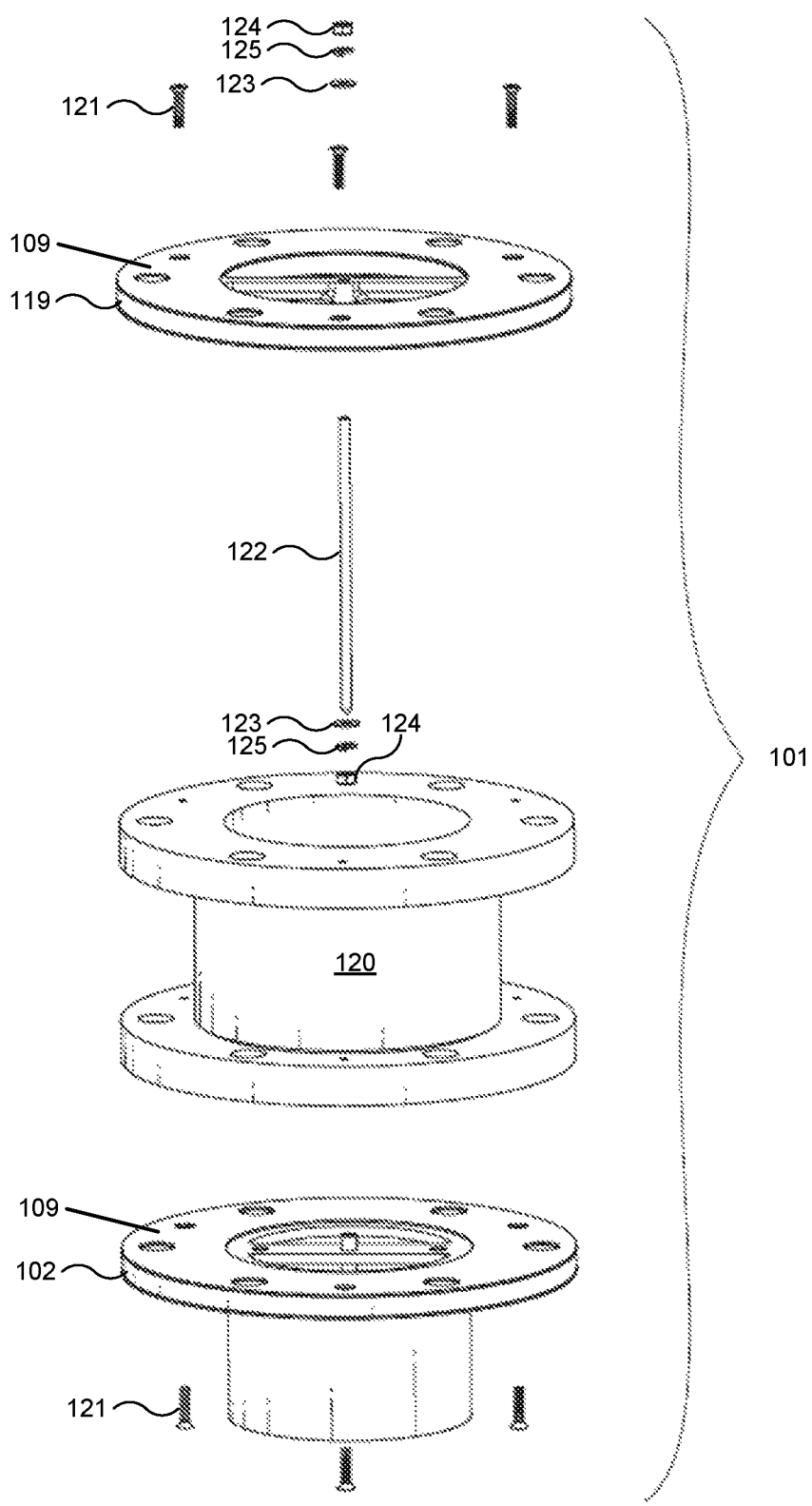
FIG. 6 is an exploded view of the water shutoff valve assembly of FIG. 4 according to some embodiments of the disclosed technologies.

FIG. 6 is an exploded view of the water shutoff valve assembly 101 of FIG. 5 according to some embodiments of the disclosed technologies. When assembled, the lockout plate 119 may be secured to the top flange of the breakoff collar 120, and the main body assembly 102 may be secured to the lower flange of the breakoff collar, by screws 121. The upper end of the activation rod 122 may be secured to the crossbar of the lockout plate 119 by nuts 124, washers 123, and lockwashers 125.

Figure 7:
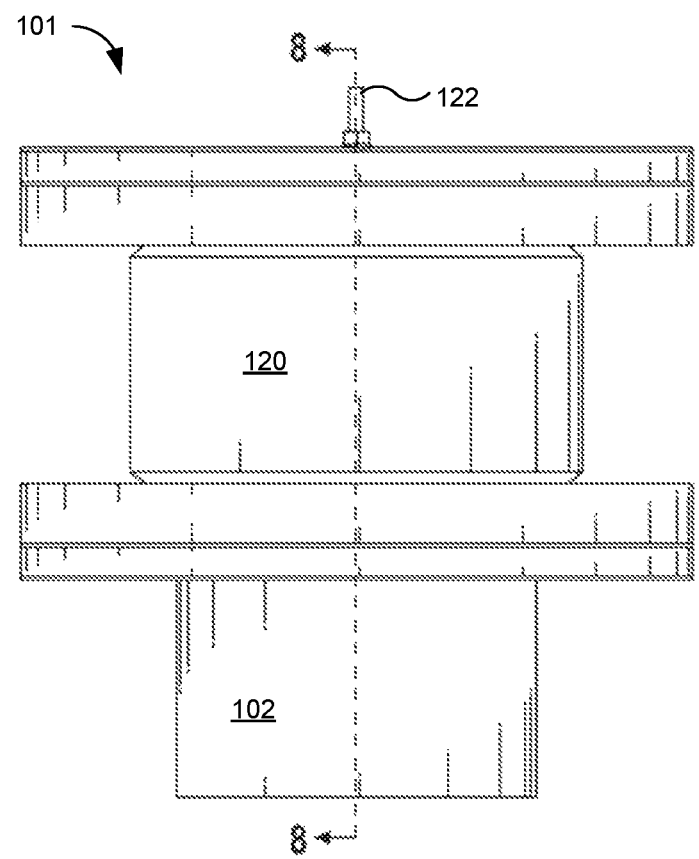
FIG. 7 illustrates the water shutoff valve assembly of FIG. 4 according to some embodiments of the disclosed technologies.
Figure 8:
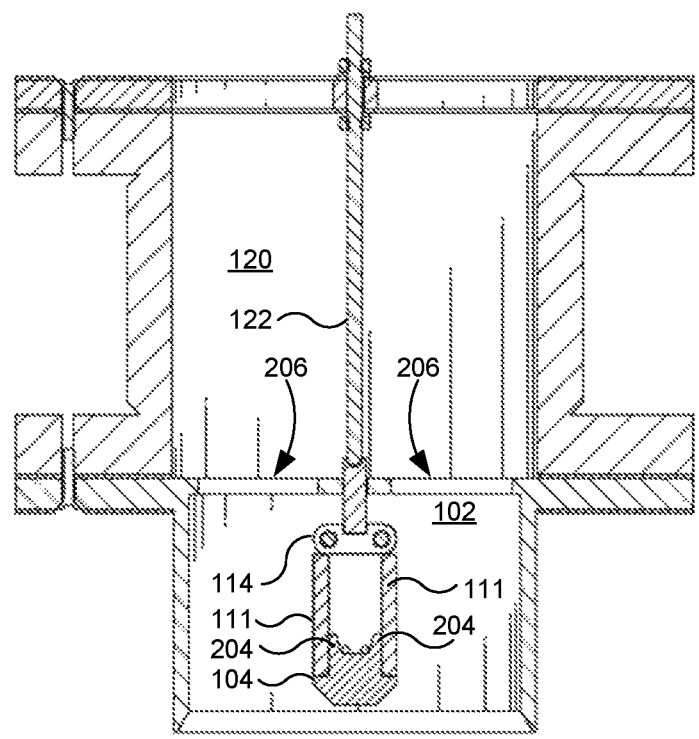
FIG. 8 is a cutaway view of the water shutoff valve assembly of FIG. 7 according to some embodiments of the disclosed technologies.

FIG. 7 illustrates the water shutoff valve assembly 101 and breakoff collar 120 of FIG. 5 according to some embodiments of the disclosed technologies. FIG. 8 is a cutaway view of the water shutoff valve assembly 101 and breakoff collar 120 of FIG. 7 according to some embodiments of the disclosed technologies.

Figure 9:
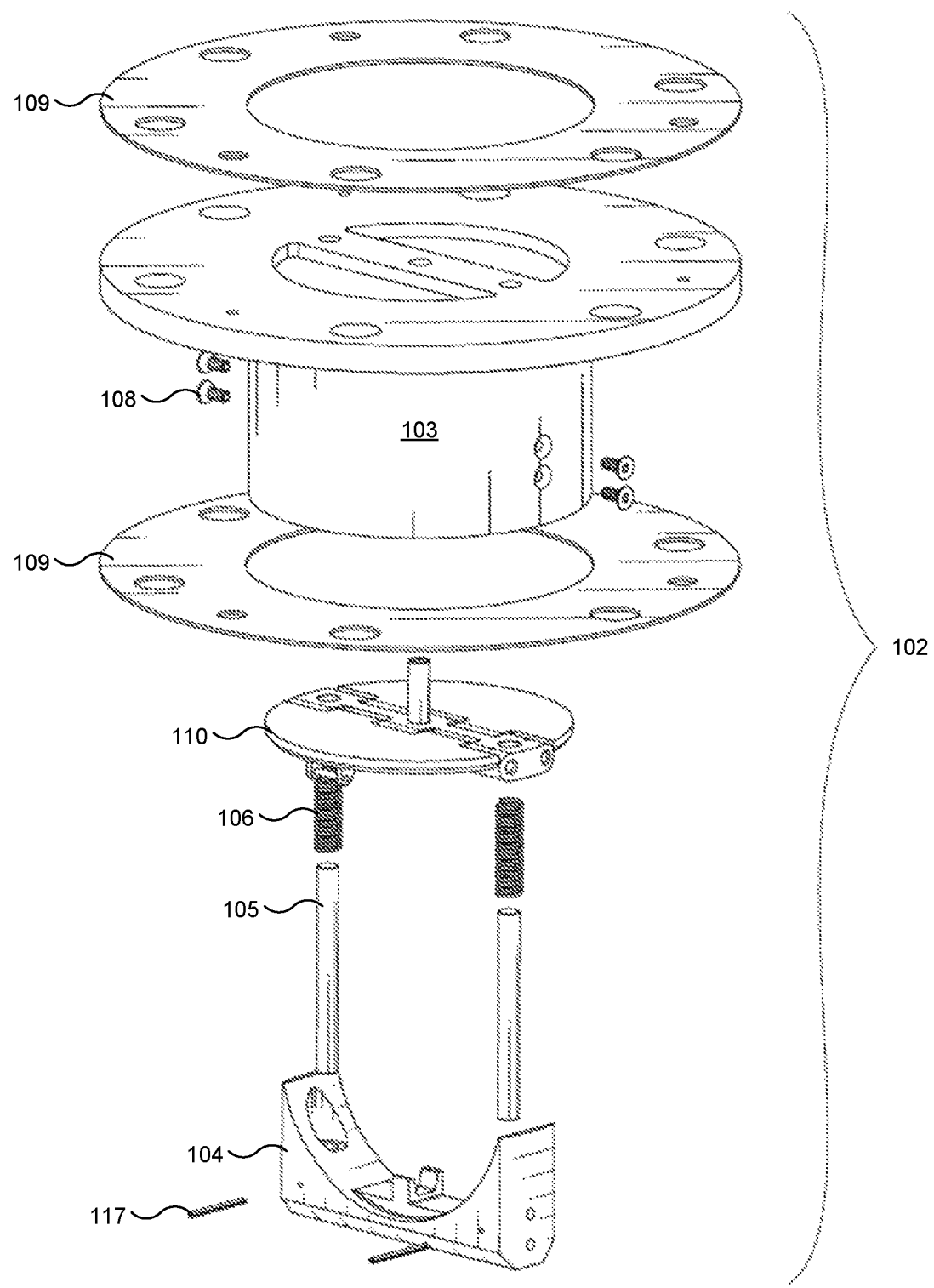
FIG. 9 is an exploded view of the main body assembly of FIG. 8 according to some embodiments of the disclosed technologies.

FIG. 9 is an exploded view of the main body assembly 102 of FIG. 8 according to some embodiments of the disclosed technologies. The main body assembly 102 may include the main body 103, the flapper assembly 110, two side slide pins 105, compression springs 106, and the saddle 104. The two side slide pins 105 may be disposed in corresponding holes in the saddle 104, and retained therein with two slotted spring pins 117. The compression springs 106 may be placed over the side slide pins 105. The flapper assembly 110 may then be placed over the side slide pins 105. Holes in the flapper assembly 110 allow the flapper assembly to slide up and down along the side slide pins 105. The main body 103 may be placed over these elements, and may be secured to the saddle 104 by screws 108. Seals 109 may be used on both sides of the flange of the main body 103.

Figure 10:
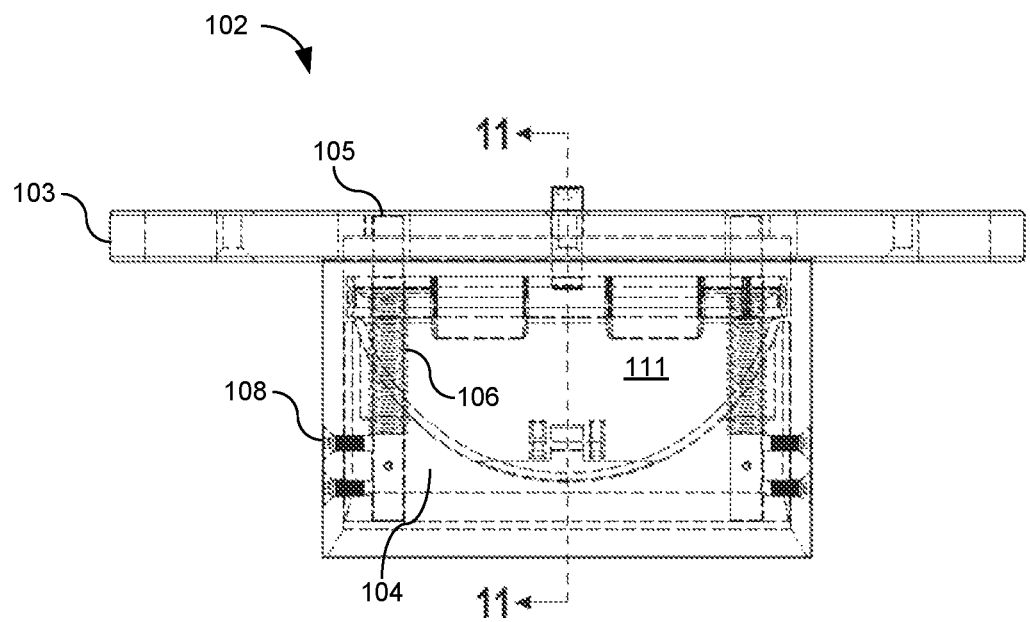
FIG. 10 is an internal view of the main body assembly of FIG. 9 with the pedals in the open position according to some embodiments of the disclosed technologies.
Figure 11:
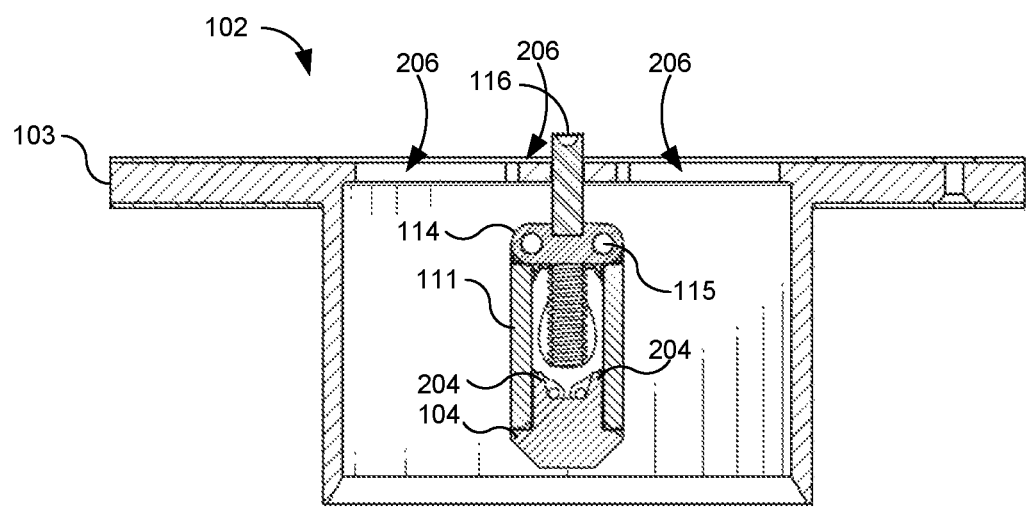
FIG. 11 is a cutaway view of the main body assembly of FIG. 10 according to some embodiments of the disclosed technologies.

FIG. 10 is an internal view of the main body assembly 102 of FIG. with the pedals 112 in the open position according to some embodiments of the disclosed technologies. FIG. 11 is a cutaway view of the main body assembly 102 of FIG. 10 according to some embodiments of the disclosed technologies. In the open configuration, the slide 114 is held in the lower position against springs 106 by the slide pin 116, and the pedals 112 are held in the open position through engagement with the saddle 104.

Figure 12:
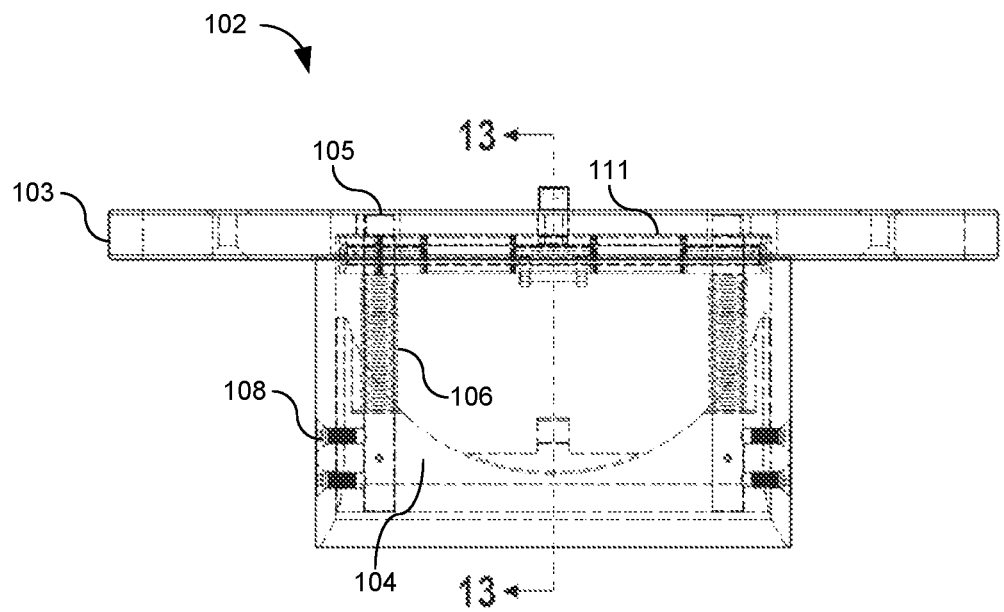
FIG. 12 is an internal view of the main body assembly of FIG. 9 with the pedals in the closed position according to some embodiments of the disclosed technologies.
Figure 13:
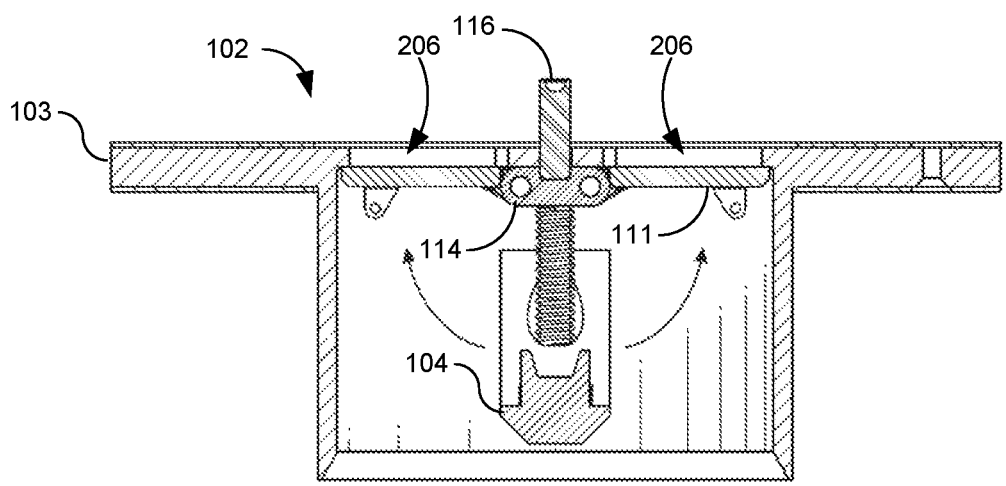
FIG. 13 is a cutaway view of the main body assembly of FIG. 12 according to some embodiments of the disclosed technologies.

FIG. 12 is an internal view of the main body assembly 102 of FIG. 8 with the pedals in the closed position according to some embodiments of the disclosed technologies. FIG. 13 is a cutaway view of the main body assembly of FIG. 12 according to some embodiments of the disclosed technologies. When the activation rod 122 is not present, for example due to accidental removal of the fire hydrant 100, the springs 106 force the slide upward and away from the saddle, freeing the pedals 112 from the saddle 104. The force of the flowing water urges the pedals 112 upward against the valve seat 206 of the main body 103, thereby shutting off the flow of water. Some embodiments may include one or more springs to assist with the motion of the pedals.

Figure 14:
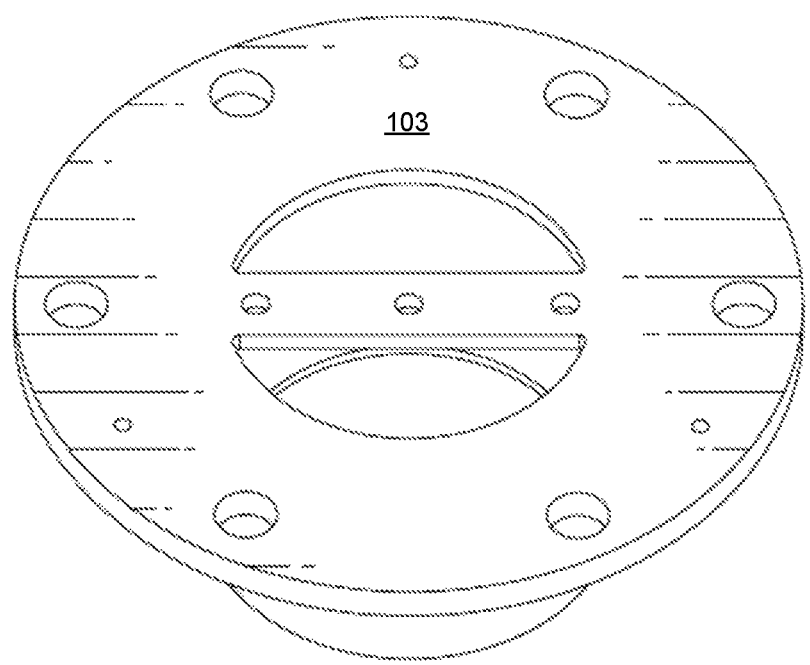
FIG. 14 illustrates the main body of the main body assembly according to some embodiments of the disclosed technologies.
Figure 15:
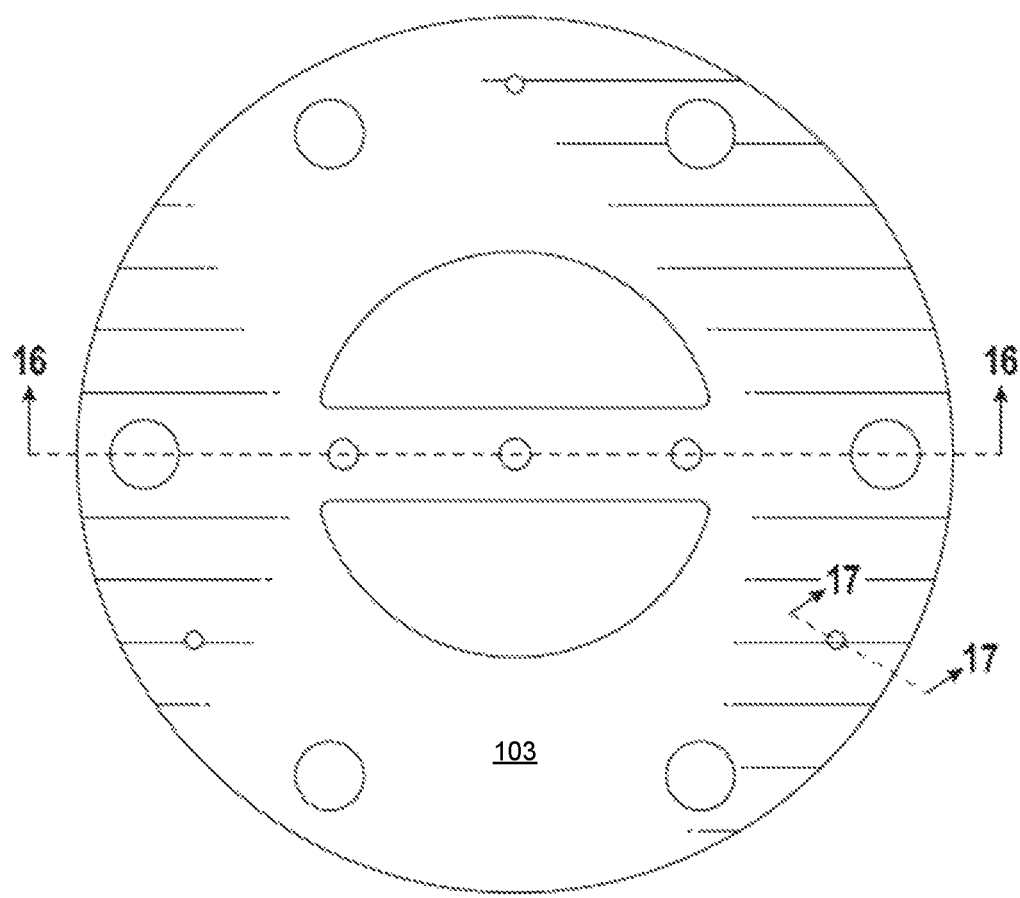
FIG. 15 is a top view of the main body according to some embodiments of the disclosed technologies.
Figure 16:
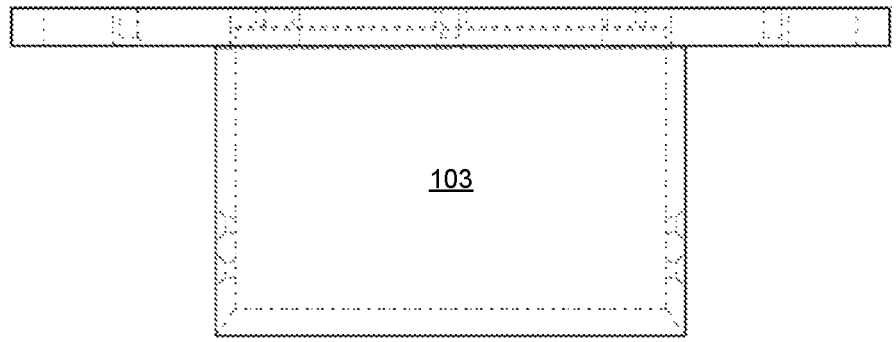
FIG. 16 is a cutaway view of the main body of FIG. 15 according to some embodiments of the disclosed technologies.
Figure 17:
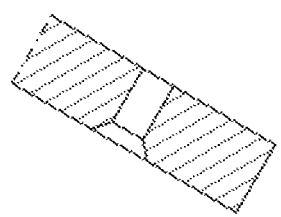
FIG. 17 is a cutaway view of the main body of FIG. 15 according to some embodiments of the disclosed technologies.

FIG. 14 illustrates the main body 103 of the main body assembly according to some embodiments of the disclosed technologies. FIG. 15 is a top view of the main body according to some embodiments of the disclosed technologies. FIG. 16 is a cutaway view of the main body of FIG. 15 according to some embodiments of the disclosed technologies. FIG. 17 is a cutaway view of the main body of FIG. 15 according to some embodiments of the disclosed technologies.

Figure 18:
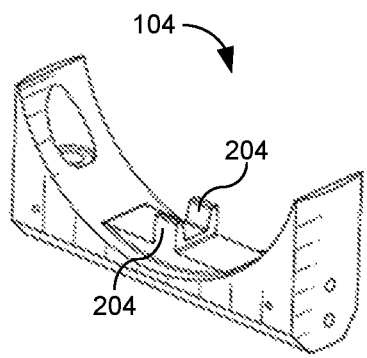
FIG. 18 illustrates the saddle of the main body assembly according to some embodiments of the disclosed technologies.
Figure 19:
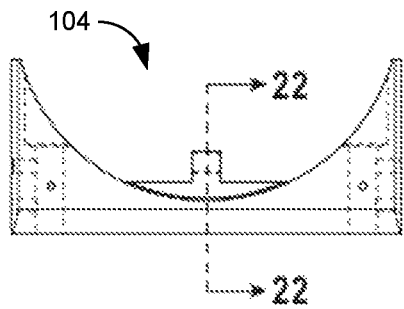
FIG. 19 is a detail view of the saddle according to some embodiments of the disclosed technologies.
Figure 20:
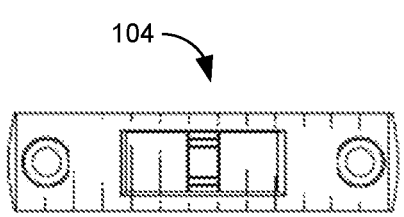
FIG. 20 is a top view of the saddle according to some embodiments of the disclosed technologies.
Figure 21:
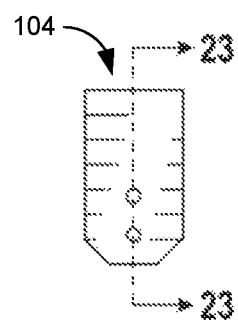
FIG. 21 is a side view of the saddle according to some embodiments of the disclosed technologies.
Figure 23:
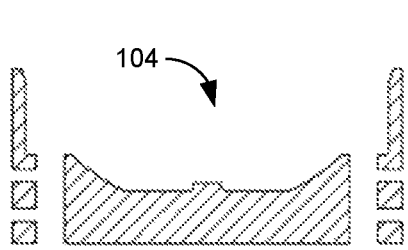
FIG. 23 is a cutaway view of the saddle of FIG. 21 according to some embodiments of the disclosed technologies.
Figure 22:
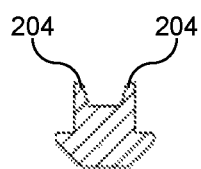
FIG. 22 is a cutaway view of the saddle of FIG. 19 according to some embodiments of the disclosed technologies.

FIG. 18 illustrates the saddle 104 of the main body assembly according to some embodiments of the disclosed technologies. FIG. 19 is a detail view of the saddle according to some embodiments of the disclosed technologies. FIG. 20 is a top view of the saddle according to some embodiments of the disclosed technologies. FIG. 21 is a side view of the saddle according to some embodiments of the disclosed technologies. FIG. 22 is a cutaway view of the saddle of FIG. 19 according to some embodiments of the disclosed technologies. FIG. 23 is a cutaway view of the saddle of FIG. 21 according to some embodiments of the disclosed technologies. In these views the retention tabs 204 of the saddle are visible.

Figure 24:
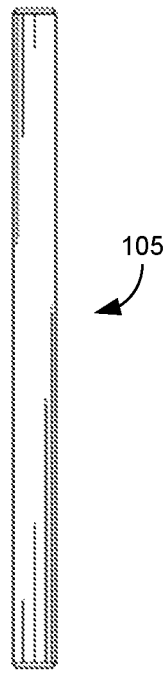
FIG. 24 illustrates the side slide pin of the main body assembly according to some embodiments of the disclosed technologies
Figure 25:
FIG. 25 is a side view of a seal according to some embodiments of the disclosed technologies.
Figure 26:
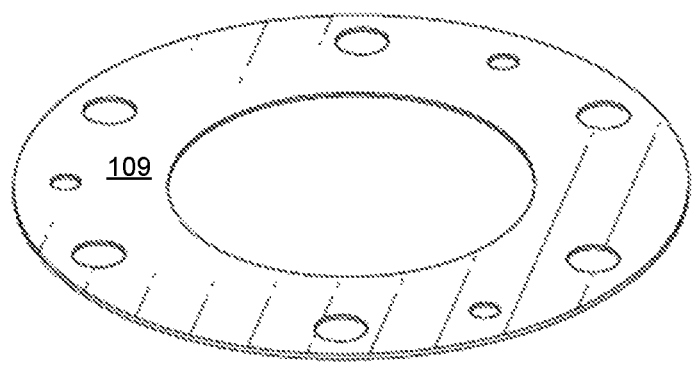
FIG. 26 is an isometric view of a seal according to some embodiments of the disclosed technologies.
Figure 27:
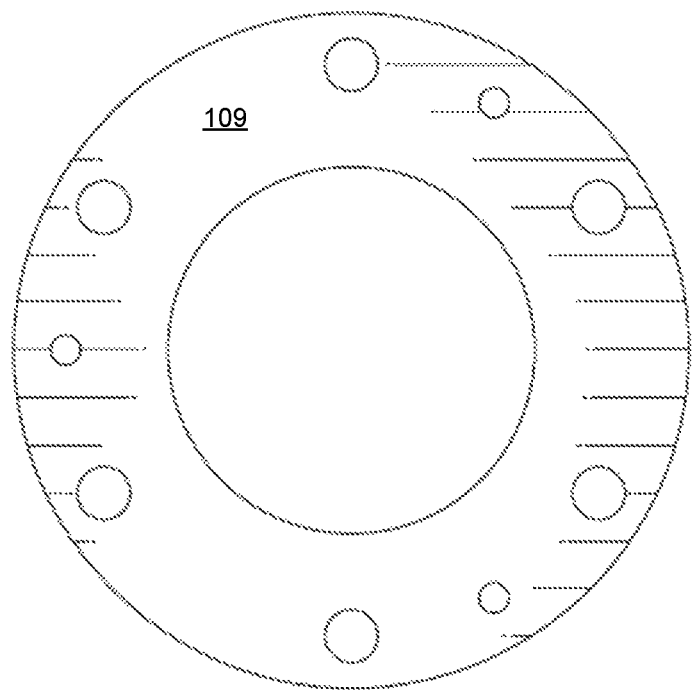
FIG. 27 is a top view of a seal according to some embodiments of the disclosed technologies.

FIG. 24 illustrates the side slide pin 105 of the main body assembly 102 according to some embodiments of the disclosed technologies. FIG. 25 is a side view of a seal 109 according to some embodiments of the disclosed technologies. FIG. 26 is an isometric view of a seal 109 according to some embodiments of the disclosed technologies. FIG. 27 is a top view of a seal 109 according to some embodiments of the disclosed technologies.

FIG. 28 is an isometric view of the flapper assembly 110 of the main body assembly according to some embodiments of the disclosed technologies. FIG. 29 is a side view of the flapper assembly 110 according to some embodiments of the disclosed technologies. FIG. 30 is a top view of the flapper assembly 110 according to some embodiments of the disclosed technologies. In the described embodiments, the flapper assembly 110 has two pedals 112. Other embodiments may have other numbers of pedals. The pedals 112 are hinged with the slide 114 by pins 115. The flapper assembly 110 also includes the slide pin 116.

Figure 31:
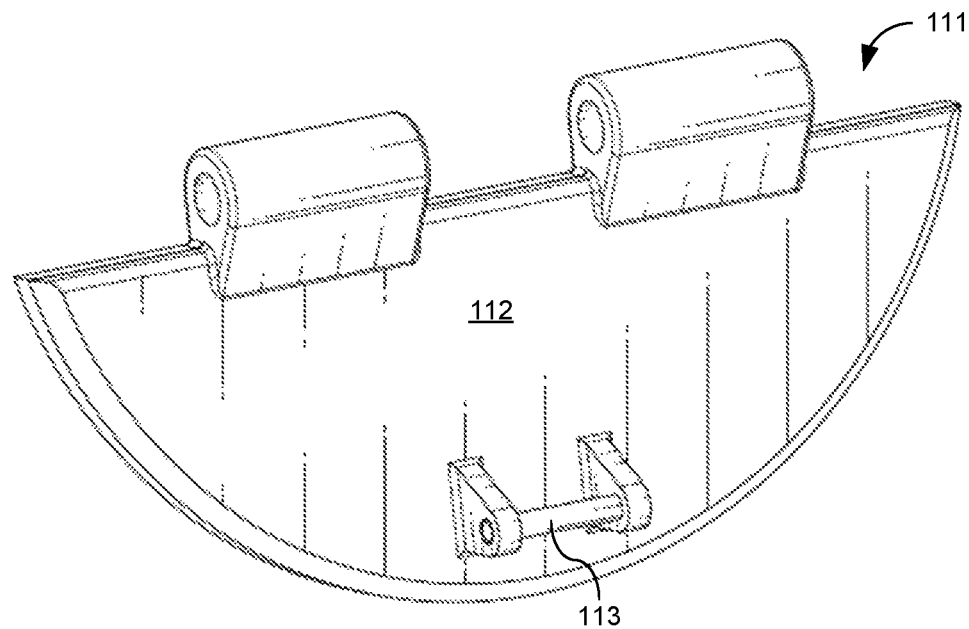
FIG. 31 is an isometric view of the pedal assy of the flapper assembly according to some embodiments of the disclosed technologies.
Figure 32:
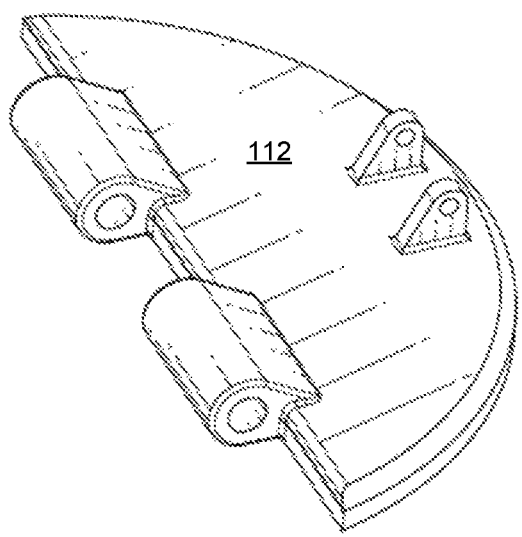
FIG. 32 is an isometric view of the pedal according to some embodiments of the disclosed technologies.
Figure 33:
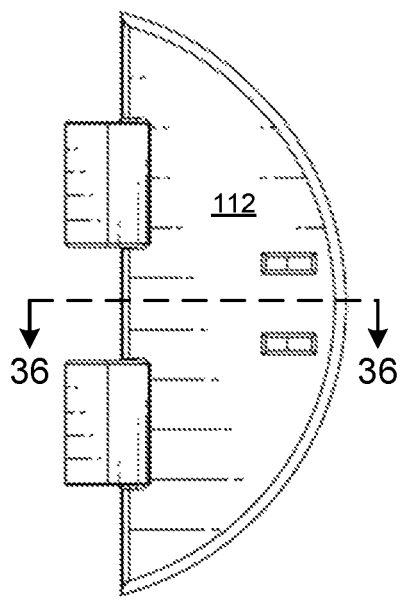
FIG. 33 is a bottom view of the pedal according to some embodiments of the disclosed technologies.
Figure 34:
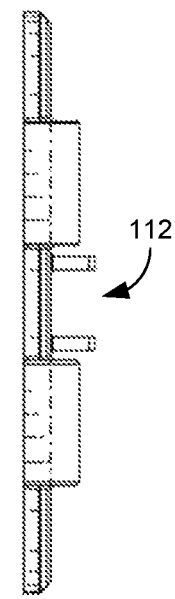
FIG. 34 is a side view of the pedal according to some embodiments of the disclosed technologies.
Figure 35:
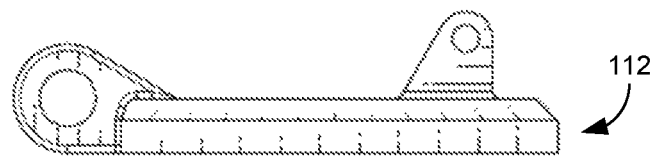
FIG. 35 is a side view of the pedal according to some embodiments of the disclosed technologies.
Figure 36:
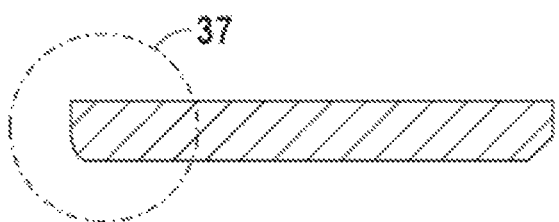
FIG. 36 is a cutaway view of the pedal of FIG. 33 according to some embodiments of the disclosed technologies.
Figure 37:
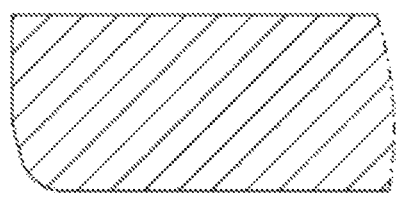
FIG. 37 is a magnified view of the of the cutaway view of the pedal of FIG. 36 according to some embodiments of the disclosed technologies.

FIG. 31 is an isometric view of a pedal assy 111 of the flapper assembly according to some embodiments of the disclosed technologies. FIG. 32 is an isometric view of the pedal 112 according to some embodiments of the disclosed technologies. FIG. 33 is a bottom view of the pedal 112 according to some embodiments of the disclosed technologies. FIG. 34 is a side view of the pedal 112 according to some embodiments of the disclosed technologies. FIG. 35 is a side view of the pedal 112 according to some embodiments of the disclosed technologies. FIG. 36 is a cutaway view of the pedal 112 of FIG. 33 according to some embodiments of the disclosed technologies. FIG. 37 is a magnified view of the of the cutaway view of the pedal 112 of FIG. 36 according to some embodiments of the disclosed technologies. When the slide 114 is in the lower position, the pedals 112 are held in the open position through engagement of the dowel pins with the retention tabs 204 of the saddle 104.

FIG. 38 is an isometric view of the slide 114 of the flapper assembly according to some embodiments of the disclosed technologies. FIG. 39 is a top view of the slide 114 according to some embodiments of the disclosed technologies. FIG. 40 is a side view of the slide 114 according to some embodiments of the disclosed technologies. FIG. 41 is a cutaway view of the slide 114 of FIG. 39 according to some embodiments of the disclosed technologies.

FIG. 42 illustrates the pin 115 of the slide 114 of the flapper assembly 110 according to some embodiments of the disclosed technologies.

Figure 44:
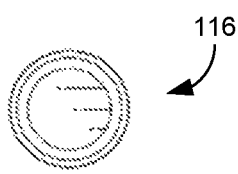
FIG. 44 is a top view of the slide pin according to some embodiments of the disclosed technologies.
Figure 43:
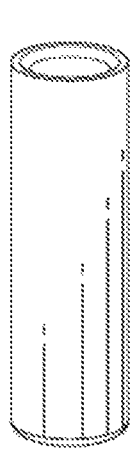
FIG. 43 is a top view of the slide pin of the flapper assembly according to some embodiments of the disclosed technologies.
Figure 45:
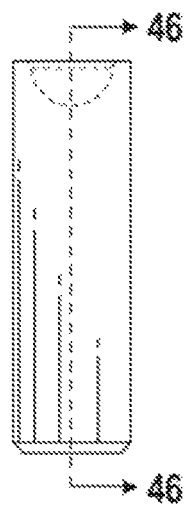
FIG. 45 is a detail view of the slide pin according to some embodiments of the disclosed technologies.
Figure 46:
FIG. 46 is a cutaway view of the slide pin of FIG. 45 according to some embodiments of the disclosed technologies.

FIG. 43 is a top view of the slide pin 116 of the flapper assembly 110 according to some embodiments of the disclosed technologies. FIG. 43 is an isometric view of the slide pin 116 according to some embodiments of the disclosed technologies. FIG. 44 is a top view of the slide pin 116 according to some embodiments of the disclosed technologies. FIG. 45 is a detail view of the slide pin 116 according to some embodiments of the disclosed technologies. FIG. 46 is a cutaway view of the slide pin 116 of FIG. 45 according to some embodiments of the disclosed technologies. As can be seen in these views, the upper end of the slide pin 116 may have a recess to accommodate the lower end of the activation rod 122.

Figure 47:
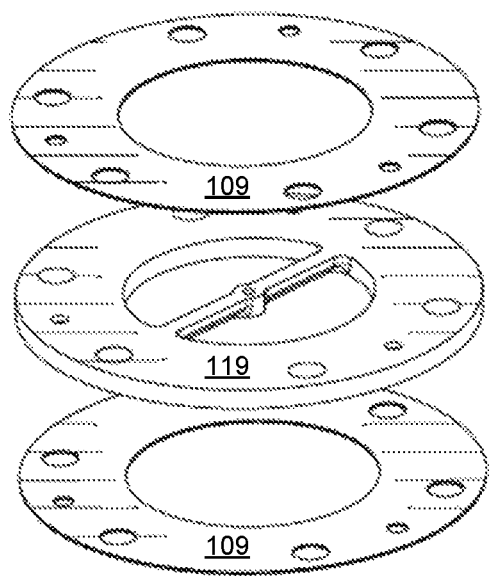
FIG. 47 is an exploded view of the lockout plate and its seals according to some embodiments of the disclosed technologies.
Figure 48:
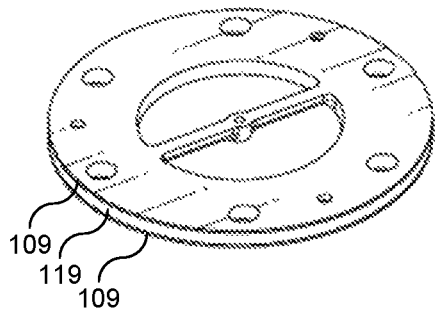
FIG. 48 is an isometric view of the lockout plate and its seals according to some embodiments of the disclosed technologies.

FIG. 47 is an exploded view of the lockout plate 119 and its seals 109 according to some embodiments of the disclosed technologies. FIG. 48 is an isometric view of the lockout plate 119 and its seals 109 according to some embodiments of the disclosed technologies.

Figure 49:
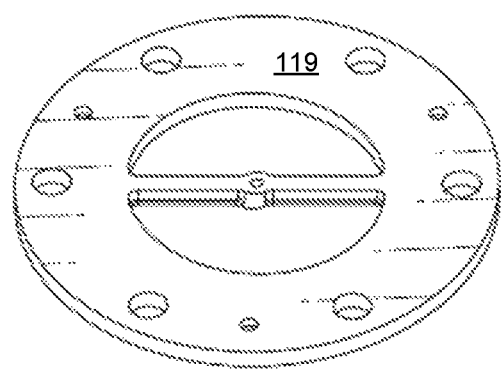
FIG. 49 is an isometric view of the lockout plate according to some embodiments of the disclosed technologies.
Figure 50:
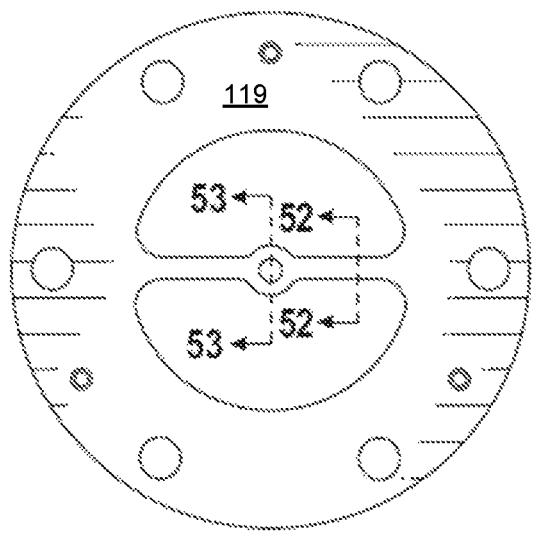
FIG. 50 is a top view of the lockout plate according to some embodiments of the disclosed technologies.
Figure 51:
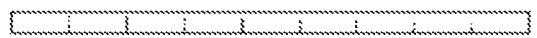
FIG. 51 is a side view of the lockout plate according to some embodiments of the disclosed technologies.
Figure 52:
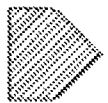
FIG. 52 is a cutaway view of the lockout plate of FIG. 50 according to some embodiments of the disclosed technologies.
Figure 53:
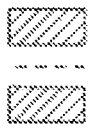
FIG. 53 is a cutaway view of the lockout plate of FIG. 50 according to some embodiments of the disclosed technologies.

FIG. 49 is an isometric view of the lockout plate 119 according to some embodiments of the disclosed technologies. FIG. 50 is a top view of the lockout plate 119 according to some embodiments of the disclosed technologies. FIG. 51 is a side view of the lockout plate 119 according to some embodiments of the disclosed technologies. FIG. 52 is a cutaway view of the lockout plate 119 of FIG. 50 according to some embodiments of the disclosed technologies. FIG. 53 is a cutaway view of the lockout plate 119 of FIG. 50 according to some embodiments of the disclosed technologies.

Figure 54:
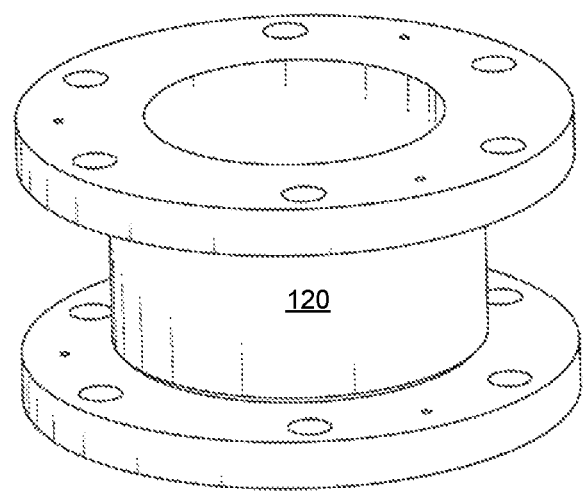
FIG. 54 is an isometric view of the break off collar according to some embodiments of the disclosed technologies.
Figure 55:
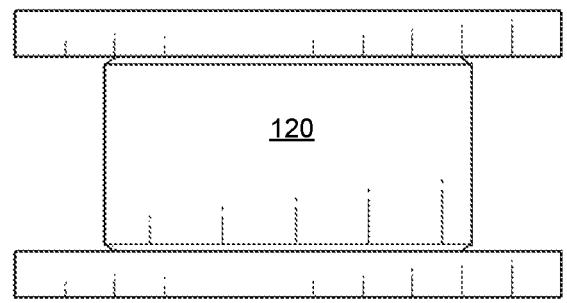
FIG. 55 is a side view of the break off collar according to some embodiments of the disclosed technologies.
Figure 56:
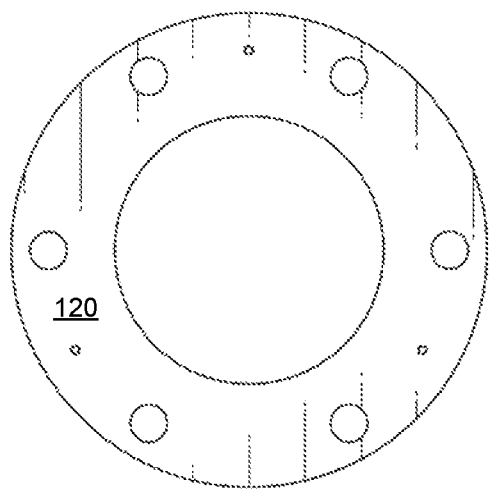
FIG. 56 is a top view of the break off collar according to some embodiments of the disclosed technologies.

FIG. 54 is an isometric view of the break off collar 120 according to some embodiments of the disclosed technologies. FIG. 55 is a side view of the break off collar 120 according to some embodiments of the disclosed technologies. FIG. 56 is a top view of the break off collar 120 according to some embodiments of the disclosed technologies. In these views it can be seen that the breakoff collar 120 is scored in one or more places. During an accident, the breakoff collar may break away along these scores.

FIG. 57 is a side view of the activation rod 122 according to some embodiments of the disclosed technologies. The upper end of the activation rod 122 may be threaded for attachment to the lockout plate 119. The bottom end of activation rod 122 may be rounded to insert into cupped slide pin 116.

During an accident, the fire hydrant 100 will break away at the breakoff bolts 126, at the breakoff collar 120, or both. When this occurs, the lockout plate 119 and the activation rod 122 will follow. Without the pressure of the activation rod 122, the springs 106 will urge the slide 114 upwards, freeing the pedals 112 from the retention tabs 204. The flowing water will force the pedals 112 against the valve seat 206, thereby shutting off the flow of water.

FIGS. 58-93 illustrate a second embodiment of an automatic shutoff valve for breakaway wet barrel fire hydrant. A list of parts shown in the drawings of the second embodiment is presented below, along with example materials, quantities and dimensions. However, it should be understood that various embodiments of the disclosed technology may be implemented with more or fewer parts, with other materials and dimensions, and combinations thereof. Some of the parts illustrated and described may be used in both the first and second embodiments.

Hydrant 300, qty 1
    Water shutoff valve assembly 301, may be all or mostly stainless steel
    Main body assembly 302, may be all or mostly stainless steel, qty 1
    Main body plate 303, may be stainless steel 304, qty 1
    Bottom saddle 304, may be stainless steel 304, qty 1
    Side slide pin 305, qty 2
    Compression spring 306, qty 2
    Slotted spring pin 107, qty 2
    Countersunk screws 108, may be $^{10}\!/_{32}$", qty 4
    Seal 109, may be $^{1}\!/_{16}$" rubber sheet, may be bonded, qty 4
    Flapper assembly 310, qty 1
    Pedal assembly 311, qty 2
    Pedal 312, qty 2
    Dowel pin 313, qty 2
    Slide 314, may be stainless steel 304, qty 1
    Pin 315, may be 0.25" DIA×5.2" LONG, qty 2
    Slide pin 116, qty 1
    Slotted spring pin 117, qty 2
    Lockout plate 119, may be stainless steel 304, qty 1
    Break off collar 120, qty 1
    Countersunk screws 121, may be $^{10}\!/_{32}$", qty 6
    Activation rod 122, qty 1
    Washer 123, may be $^{1}\!/_{4}$", qty 2
    Nut 124, may be $^{1}\!/_{4}$", qty 2
    Lock washer 125, may be $^{1}\!/_{4}$", qty 2
    Breakaway bolt 126, with nuts, qty 6
    Bolt 127, with nuts, qty 6
    Riser 140
    Retention tabs 404, qty 2
    Valve seat 406
    Lockable socket head screws 502, qty 4
    Lockwire 504, qty 2

Figure 58:
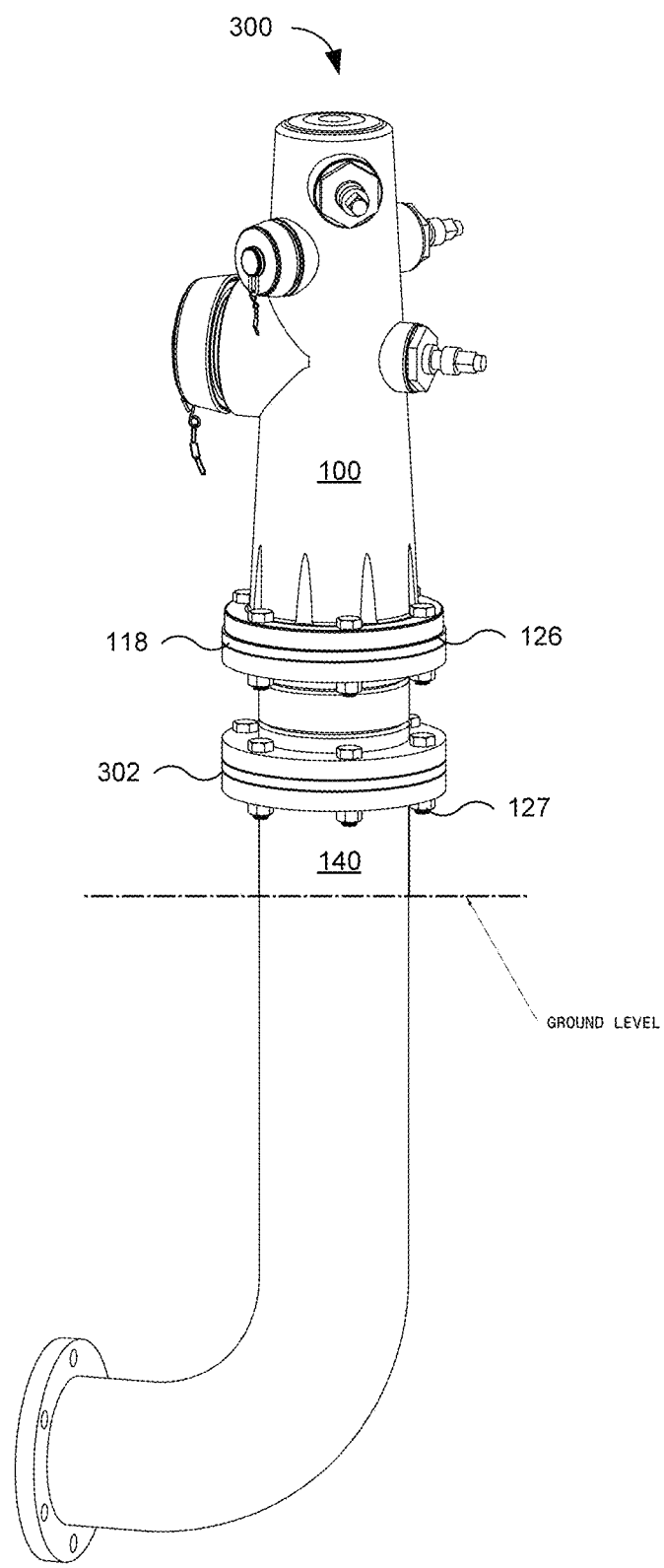
FIG. 58 illustrates a fire hydrant installation according to some embodiments of the disclosed technologies.

FIG. 58 illustrates a fire hydrant installation 300 according to some embodiments of the disclosed technologies. Referring to FIG. 58, portions of the main body assembly 302 and lockout plate 119 are visible. In some embodiments, breakaway bolts 126 and nuts 127 are used to secure the lockout plate 119 between the hydrant 300 and the breakoff collar 120. This arrangement allows the hydrant to break away cleanly, at the bolts 126, at the breakoff collar 120, or both.

Figure 59:
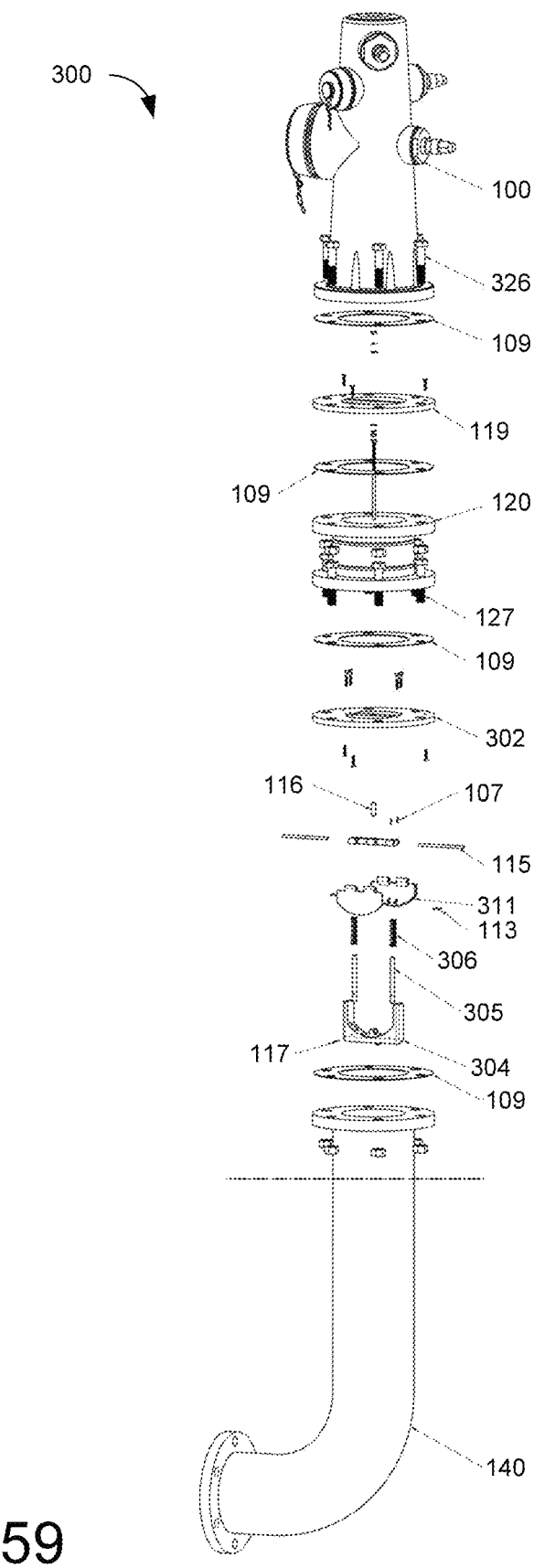
FIG. 59 is an exploded view of the fire hydrant installation of FIG. 58 according to some embodiments of the disclosed technologies.

FIG. 59 is an exploded view of the fire hydrant installation 300 of FIG. 58 according to some embodiments of the disclosed technologies.

Figure 60:
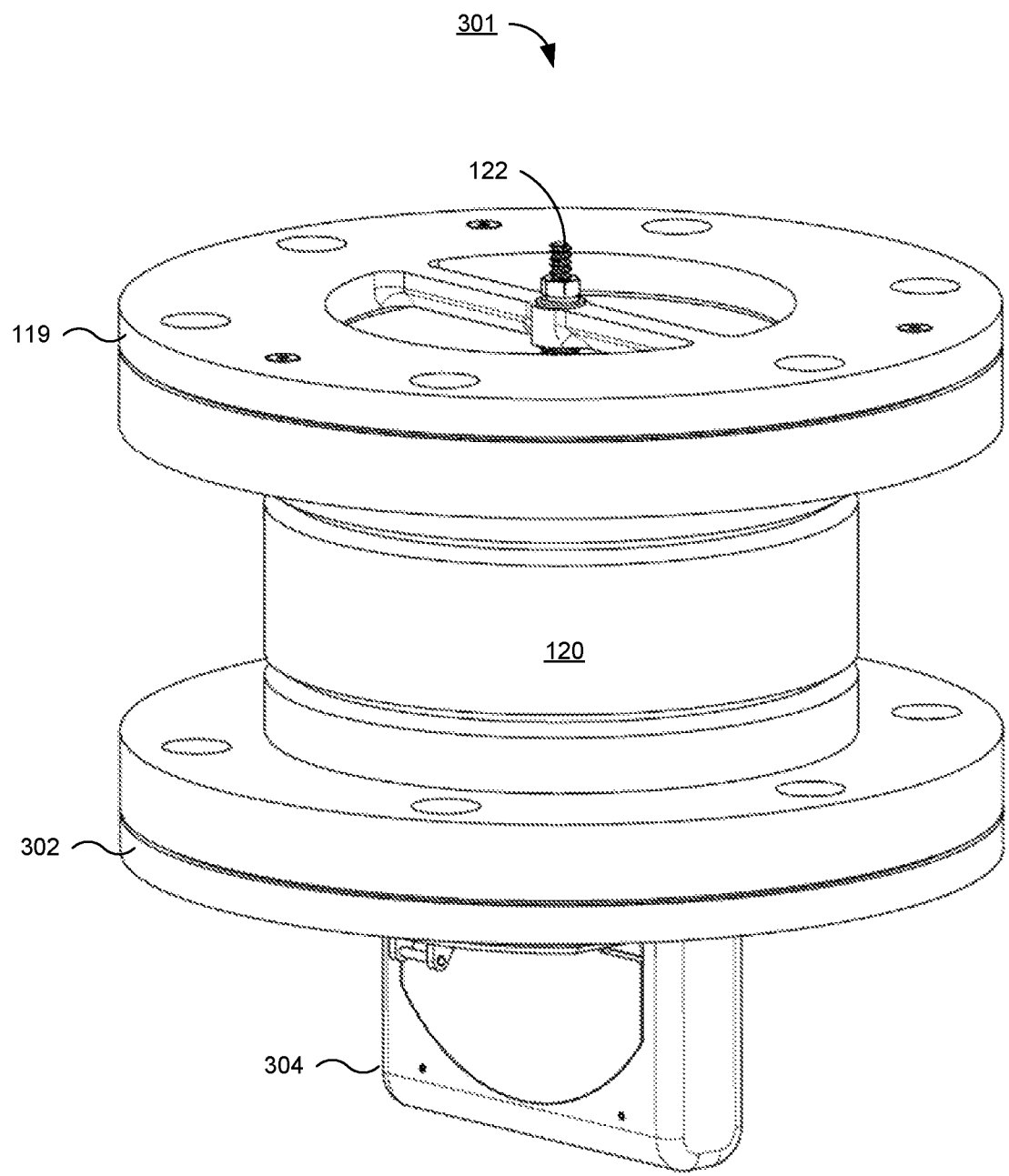
FIG. 60 illustrates the water shutoff valve assembly and breakoff collar of FIG. 59 according to some embodiments of the disclosed technologies.

FIG. 60 illustrates the water shutoff valve assembly 301 and breakoff collar 120 of FIG. 59 according to some embodiments of the disclosed technologies.

Figure 61:
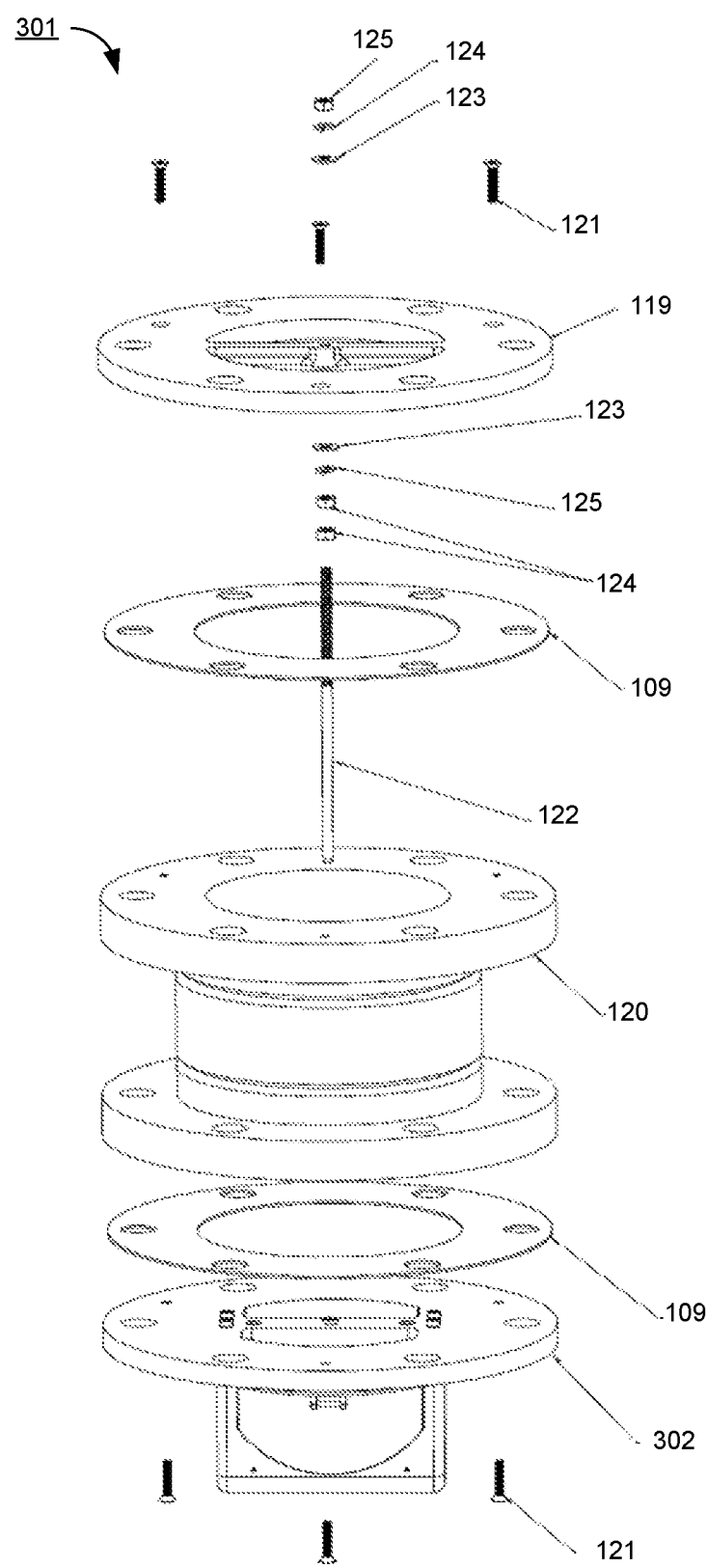
FIG. 61 is an exploded view of the water shutoff valve assembly of FIG. 5 according to some embodiments of the disclosed technologies.

FIG. 61 is an exploded view of the water shutoff valve assembly 101 of FIG. 5 according to some embodiments of the disclosed technologies. When assembled, the lockout plate 119 may be secured to the top flange of the breakoff collar 120, and the main body assembly 302 may be secured to the lower flange of the breakoff collar, by screws 121. The upper end of the activation rod 122 may be secured to the crossbar of the lockout plate 119 by nuts 124, washers 123, and lockwashers 125.

Figure 62:
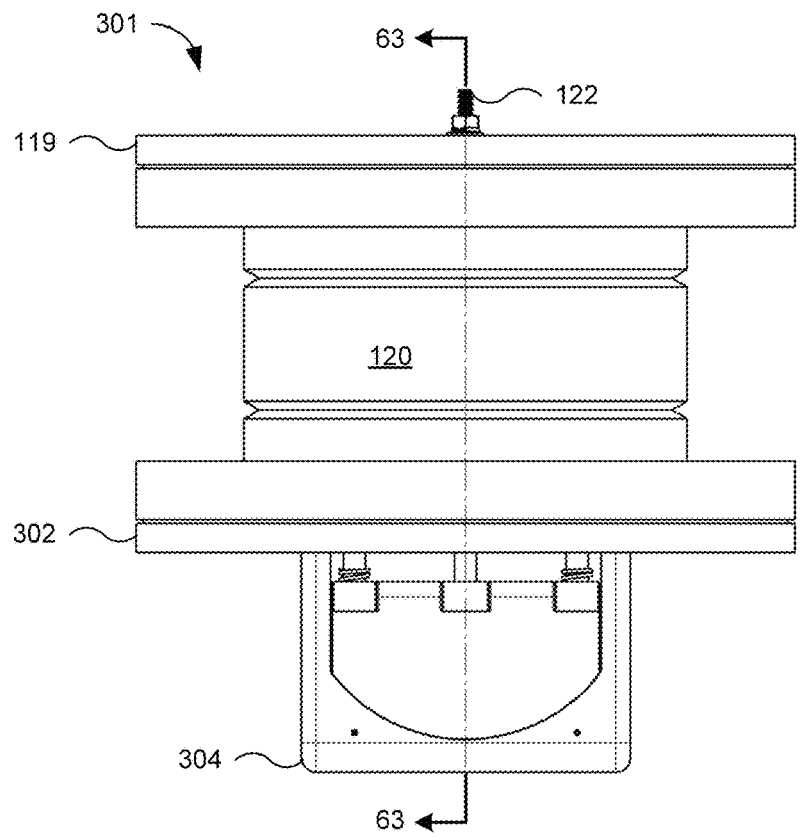
FIG. 62 illustrates the water shutoff valve assembly and breakoff collar of FIG. 60 according to some embodiments of the disclosed technologies.
Figure 63:
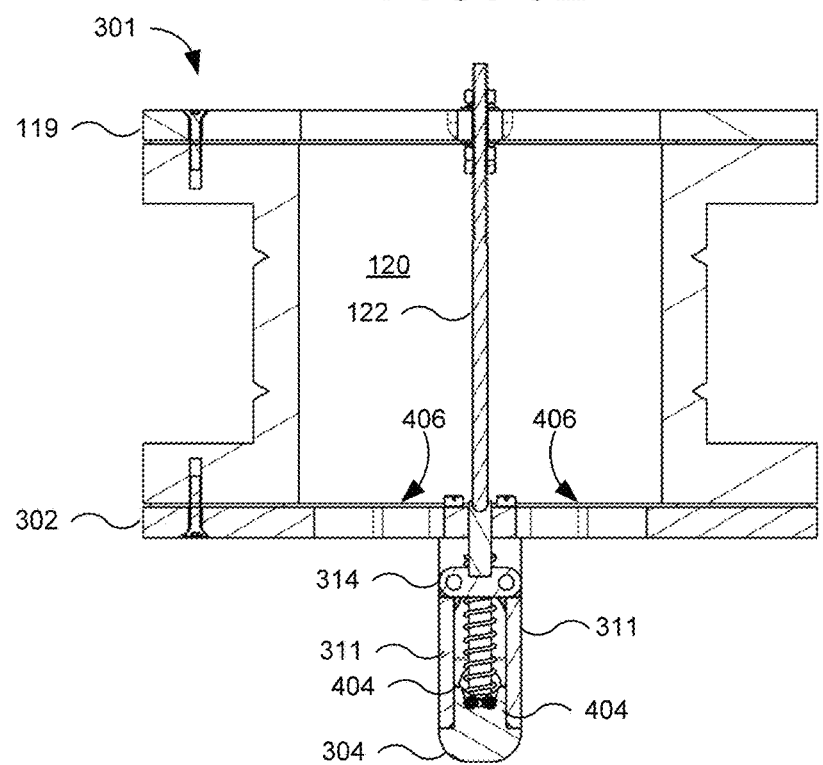
FIG. 63 is a cutaway view of the water shutoff valve assembly and breakoff collar of FIG. 62 according to some embodiments of the disclosed technologies.

FIG. 62 illustrates the water shutoff valve assembly 301 and breakoff collar 120 of FIG. 60 according to some embodiments of the disclosed technologies. FIG. 63 is a cutaway view of the water shutoff valve assembly 301 and breakoff collar 120 of FIG. 62 according to some embodiments of the disclosed technologies.

Figure 64:
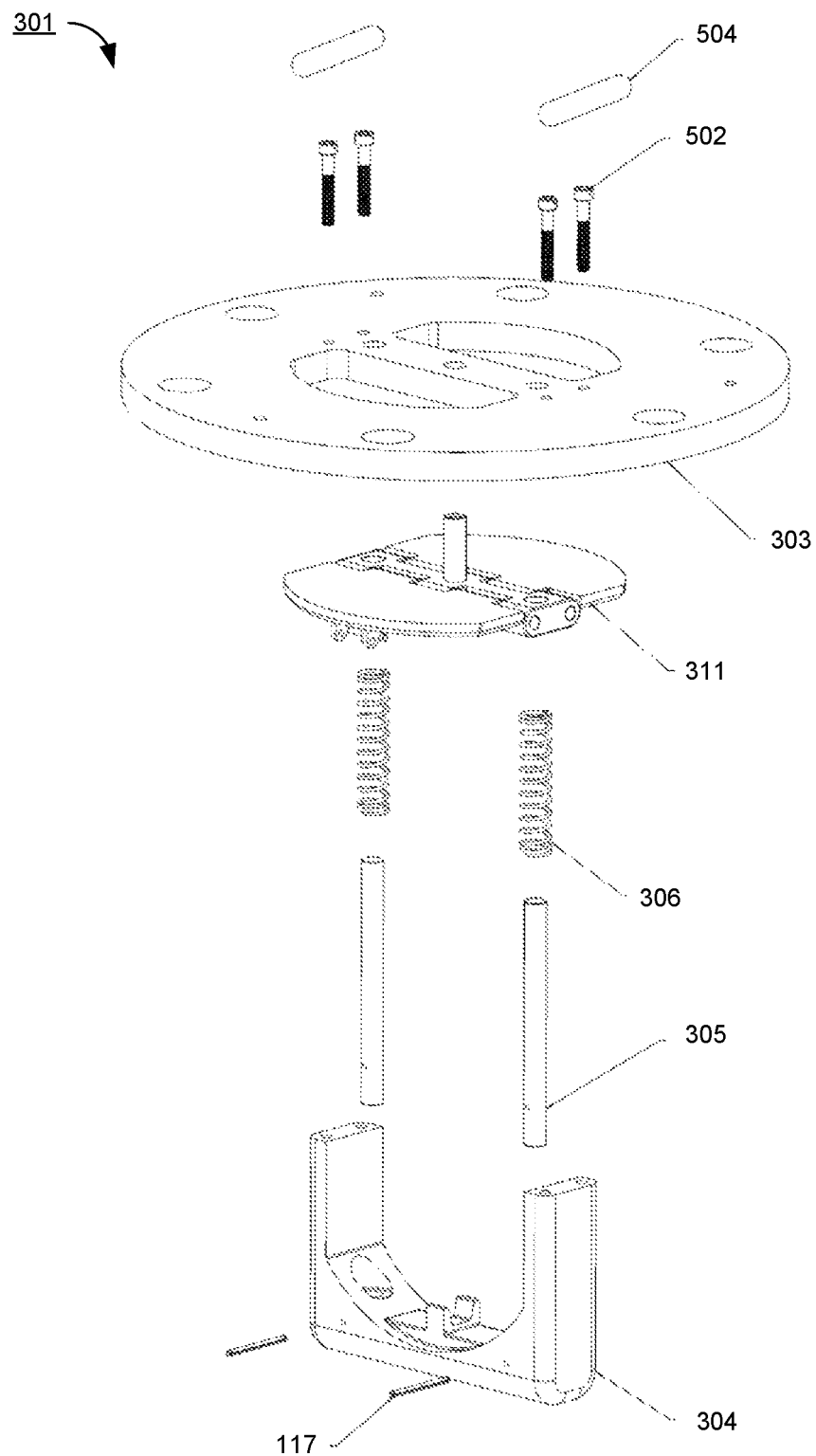
FIG. 64 is an exploded view of the main body assembly of FIG. 63 according to some embodiments of the disclosed technologies.

FIG. 64 is an exploded view of the main body assembly 302 of FIG. 63 according to some embodiments of the disclosed technologies. The main body assembly 302 may include the main body plate 303, the flapper assembly 310, two side slide pins 305, compression springs 306, and the saddle 304. The two side slide pins 305 may be disposed in corresponding holes in the saddle 304, and retained therein with two slotted spring pins 117. The compression springs 306 may be placed over the side slide pins 305. The flapper assembly 310 may then be placed over the side slide pins 305. Holes in the flapper assembly 310 allow the flapper assembly to slide up and down along the side slide pins 305. The main body plate 303 may be placed over these elements, and may be secured to the saddle 304 by screws 502 and lockwires 504. Seals 109 may be used on both sides of the flange of the main body plate 303.

Figure 65:
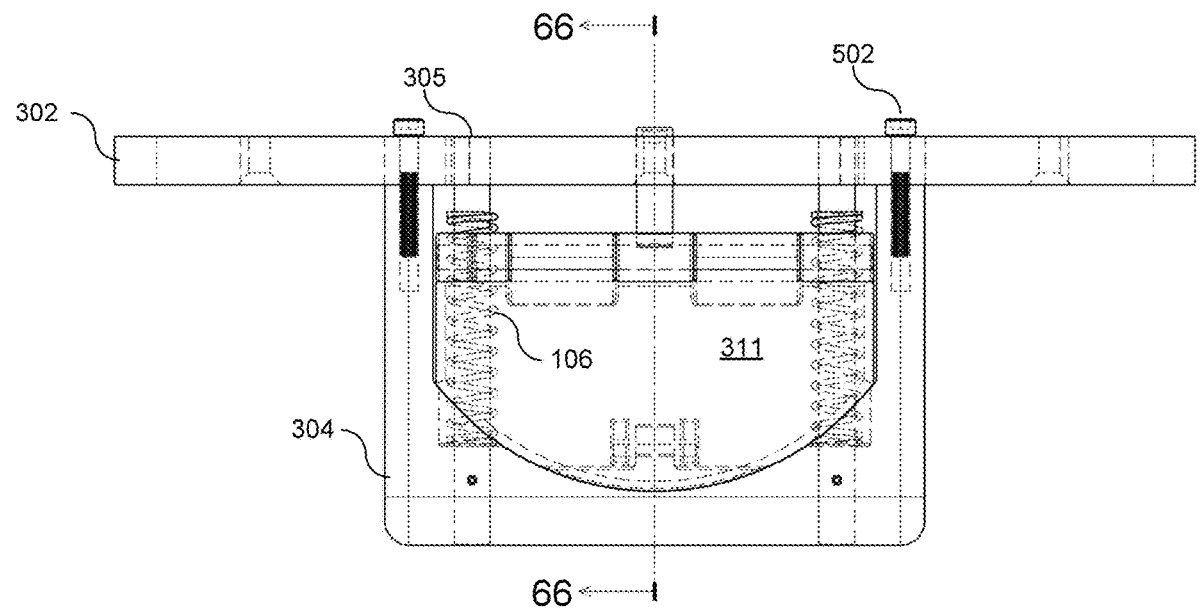
FIG. 65 is an internal view of the main body assembly of FIG. 64 with the pedals in the open position according to some embodiments of the disclosed technologies.
Figure 66:
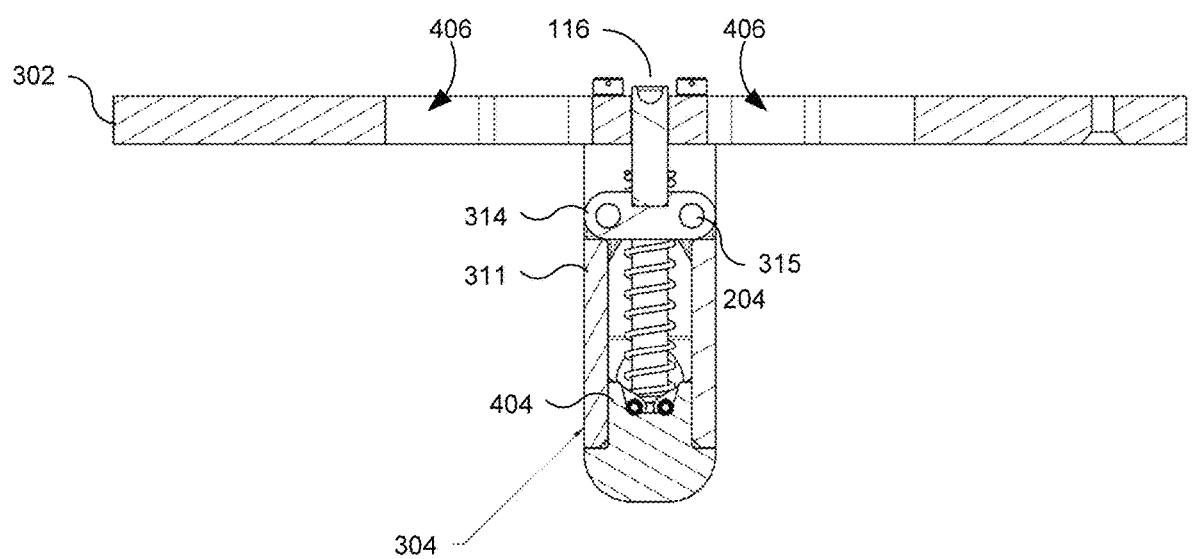
FIG. 66 is a cutaway view of the main body assembly of FIG. 65 according to some embodiments of the disclosed technologies.

FIG. 65 is an internal view of the main body assembly 302 of FIG. 64 with the pedals 312 in the open position according to some embodiments of the disclosed technologies. FIG. 66 is a cutaway view of the main body assembly 302 of FIG. 65 according to some embodiments of the disclosed technologies. In the open configuration, the slide 314 is held in the lower position against springs 306 by the slide pin 116, and the pedals 312 are held in the open position through engagement with the saddle 304.

Figure 67:
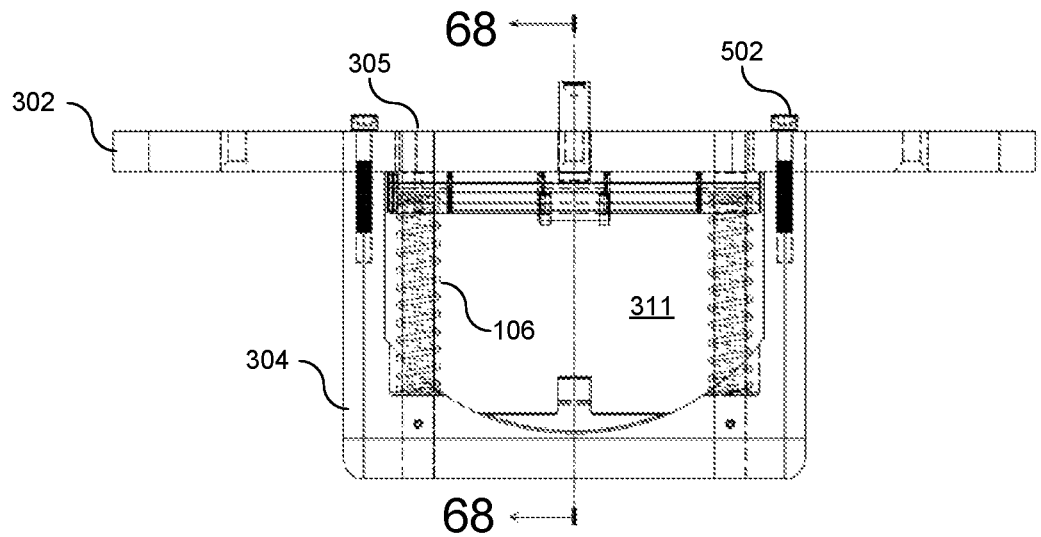
FIG. 67 is an internal view of the main body assembly of FIG. 63 with the pedals in the closed position according to some embodiments of the disclosed technologies.
Figure 68:
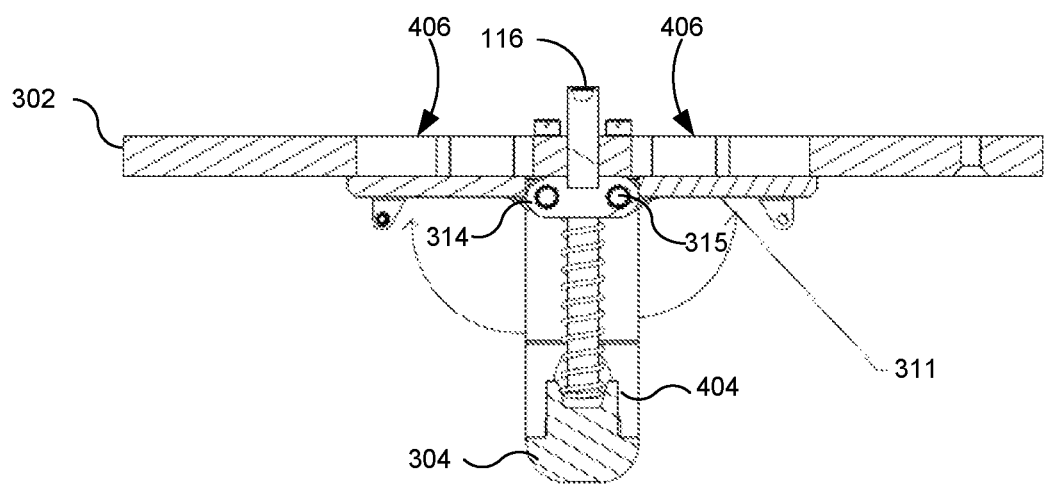
FIG. 68 is a cutaway view of the main body assembly of FIG. 67 according to some embodiments of the disclosed technologies.

FIG. 67 is an internal view of the main body assembly 302 of FIG. 63 with the pedals in the closed position according to some embodiments of the disclosed technologies. FIG. 68 is a cutaway view of the main body assembly of FIG. 67 according to some embodiments of the disclosed technologies. When the activation rod 122 is not present, for example due to accidental removal of the fire hydrant 300, the springs 306 force the slide upward and away from the saddle, freeing the pedals 312 from the saddle 304. The force of the flowing water urges the pedals 312 upward against the valve seat 406 of the main body plate 303, thereby shutting off the flow of water. Some embodiments may include one or more springs to assist with the motion of the pedals.

Figure 69:
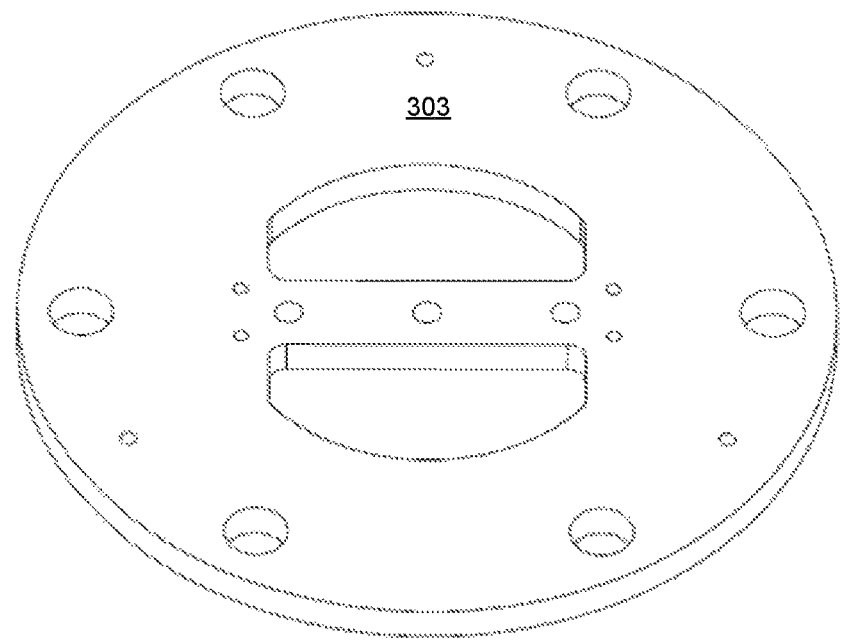
FIG. 69 illustrates the main body of the main body assembly according to some embodiments of the disclosed technologies.
Figure 70:
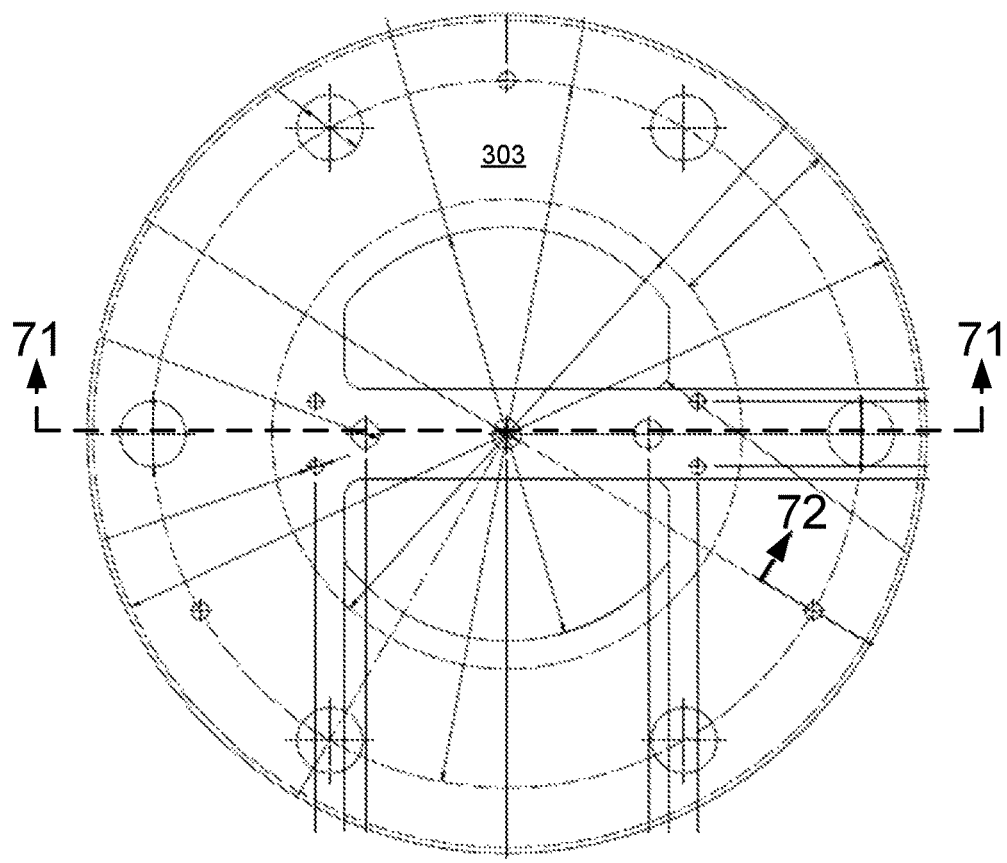
FIG. 70 is a top view of the main body according to some embodiments of the disclosed technologies.
Figure 71:
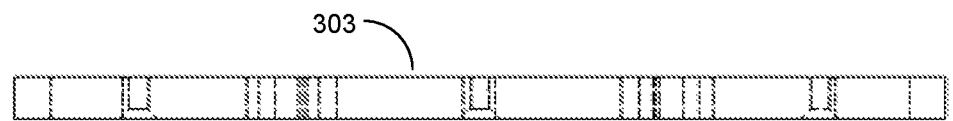
FIG. 71 is a cutaway view of the main body of FIG. 70 according to some embodiments of the disclosed technologies.
Figure 72:
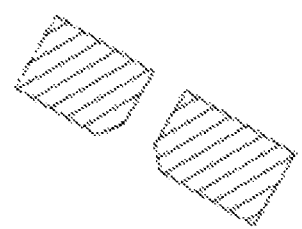
FIG. 72 is a cutaway view of the main body of FIG. 70 according to some embodiments of the disclosed technologies.

FIG. 69 illustrates the main body plate 303 of the main body assembly according to some embodiments of the disclosed technologies. FIG. 70 is a top view of the main body plate 303 according to some embodiments of the disclosed technologies. FIG. 71 is a cutaway view of the main body plate 303 of FIG. 70 according to some embodiments of the disclosed technologies. FIG. 72 is a cutaway view of the main body plate 303 of FIG. 70 according to some embodiments of the disclosed technologies.

Figure 73:
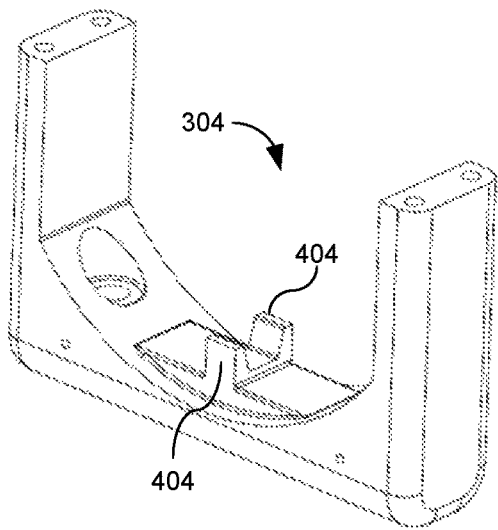
FIG. 73 illustrates the saddle of the main body assembly according to some embodiments of the disclosed technologies.
Figure 74:
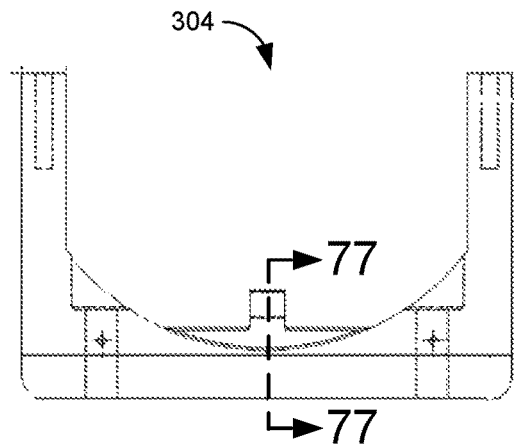
FIG. 74 is a detail view of the saddle according to some embodiments of the disclosed technologies.
Figure 75:
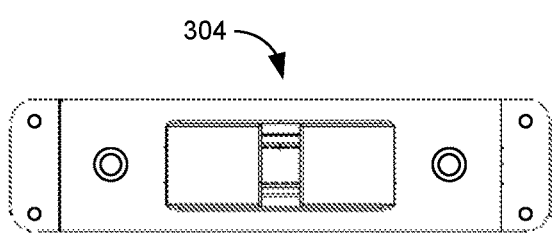
FIG. 75 is a top view of the saddle according to some embodiments of the disclosed technologies.
Figure 76:
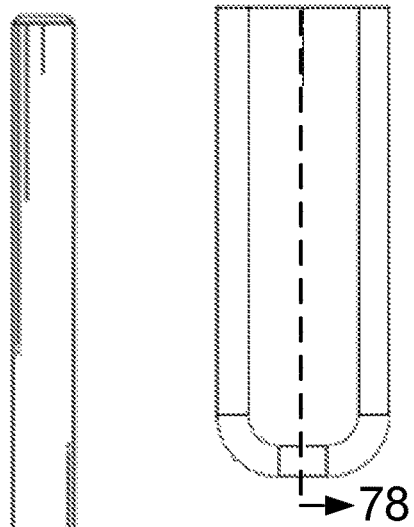
FIG. 76 is a side view of the saddle according to some embodiments of the disclosed technologies.
Figure 77:
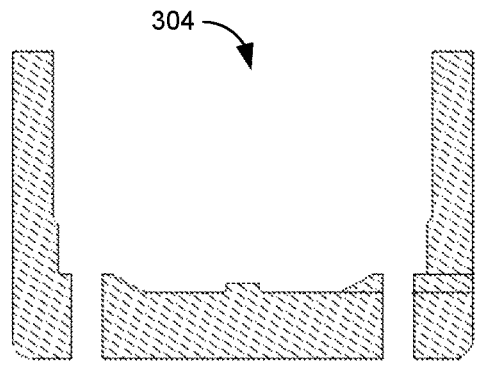
FIG. 77 is a cutaway view of the saddle of FIG. 74 according to some embodiments of the disclosed technologies.
Figure 78:
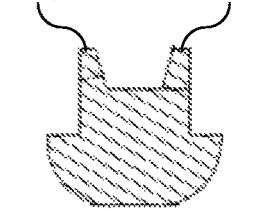
FIG. 78 is a cutaway view of the saddle of FIG. 76 according to some embodiments of the disclosed technologies.

FIG. 73 illustrates the saddle 304 of the main body assembly according to some embodiments of the disclosed technologies. FIG. 74 is a detail view of the saddle according to some embodiments of the disclosed technologies. FIG. 75 is a top view of the saddle according to some embodiments of the disclosed technologies. FIG. 76 is a side view of the saddle according to some embodiments of the disclosed technologies. FIG. 77 is a cutaway view of the saddle of FIG. 74 according to some embodiments of the disclosed technologies. FIG. 78 is a cutaway view of the saddle of FIG. 76 according to some embodiments of the disclosed technologies. In these views the retention tabs 404 of the saddle are visible.

Figure 79:
FIG. 79 illustrates the side slide pin of the main body assembly according to some embodiments of the disclosed technologies.

FIG. 79 illustrates the side slide pin 305 of the main body assembly 302 according to some embodiments of the disclosed technologies.

Figure 80:
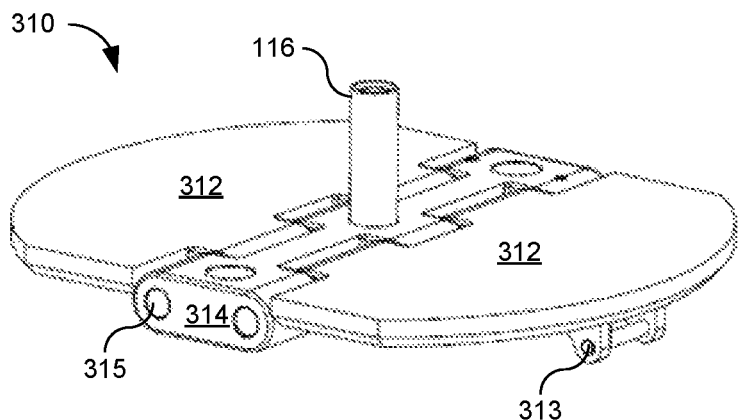
FIG. 80 is an isometric view of the flapper assembly of the main body assembly according to some embodiments of the disclosed technologies.
Figure 81:
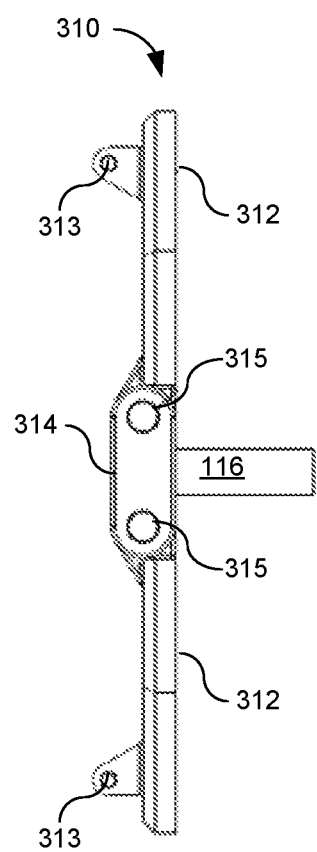
FIG. 81 is a side view of the flapper assembly according to some embodiments of the disclosed technologies.
Figure 82:
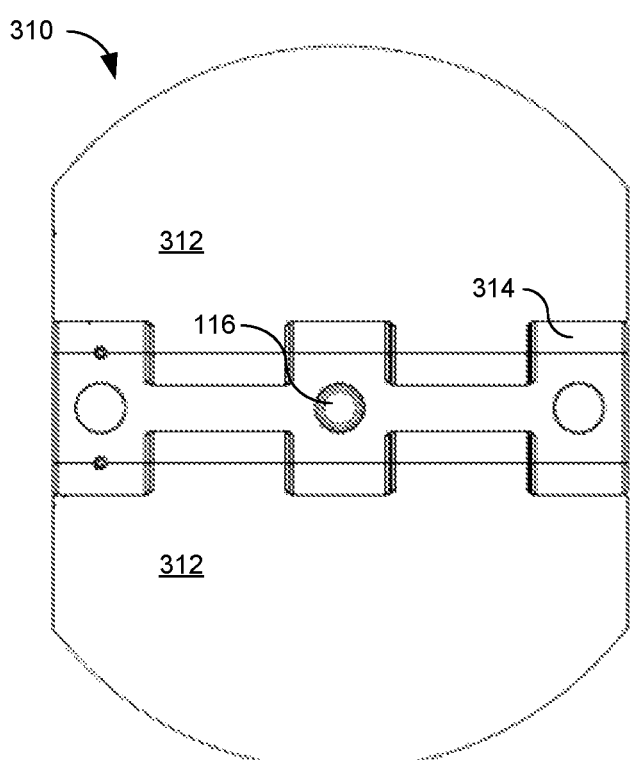
FIG. 82 is a top view of the flapper assembly according to some embodiments of the disclosed technologies.

FIG. 80 is an isometric view of the flapper assembly 310 of the main body assembly according to some embodiments of the disclosed technologies. FIG. 81 is a side view of the flapper assembly 310 according to some embodiments of the disclosed technologies. FIG. 82 is a top view of the flapper assembly 310 according to some embodiments of the disclosed technologies. In the described embodiments, the flapper assembly 310 has two pedals 312. Other embodiments may have other numbers of pedals. The pedals 312 are hinged with the slide 314 by pins 315. The flapper assembly 310 also includes the slide pin 116.

Figure 83:
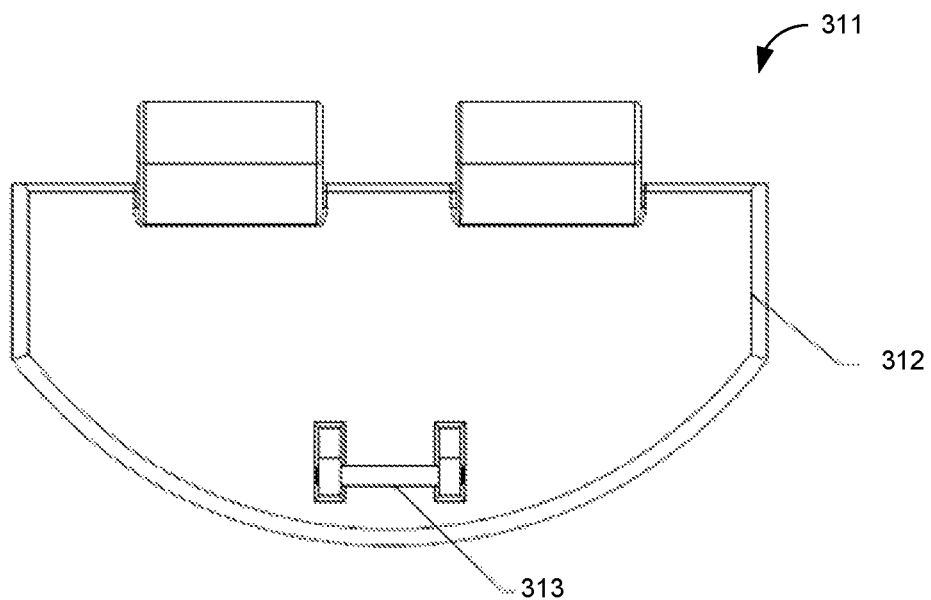
FIG. 83 is an bottom view of a pedal assy of the flapper assembly according to some embodiments of the disclosed technologies.
Figure 84:
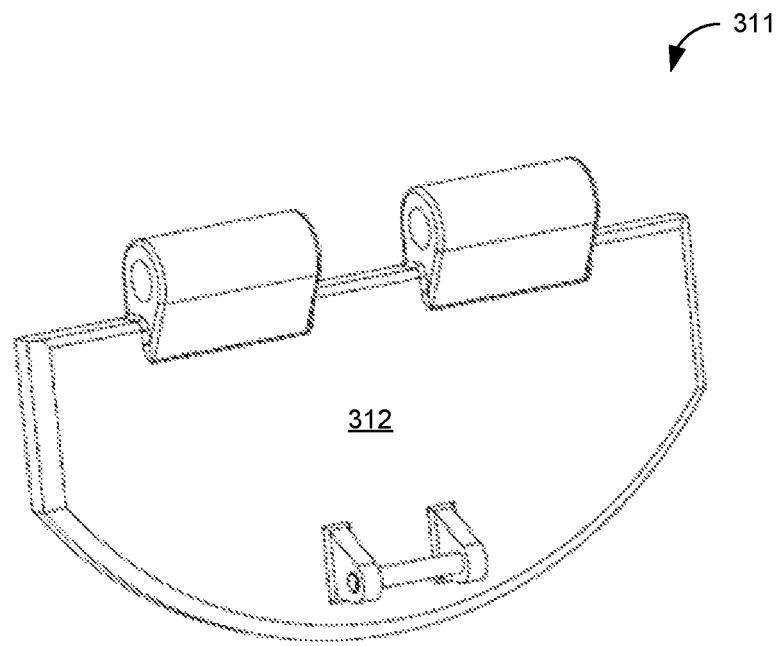
FIG. 84 is an isometric view of the pedal assy according to some embodiments of the disclosed technologies.

FIG. 83 is an bottom view of a pedal assy 311 of the flapper assembly according to some embodiments of the disclosed technologies. FIG. 84 is an isometric view of the pedal assy 311 according to some embodiments of the disclosed technologies. FIG. 85 is a bottom view of the pedal 312 according to some embodiments of the disclosed technologies. FIG. 86 is a side view of the pedal 312 according to some embodiments of the disclosed technologies. FIG. 87 is a side view of the pedal 312 according to some embodiments of the disclosed technologies. FIG. 88 is a cutaway view of the pedal 312 of FIG. 85 according to some embodiments of the disclosed technologies. When the slide 314 is in the lower position, the pedals 312 are held in the open position through engagement of the dowel pins with the retention tabs 204 of the saddle 304.

FIG. 89 is an isometric view of the slide 314 of the flapper assembly according to some embodiments of the disclosed technologies. FIG. 90 is a top view of the slide 314 according to some embodiments of the disclosed technologies. FIG. 91 is a side view of the slide 314 according to some embodiments of the disclosed technologies. FIG. 92 is a cutaway view of the slide 314 of FIG. 90 according to some embodiments of the disclosed technologies.

FIG. 93 illustrates the pin 315 of the slide 314 of the flapper assembly 310 according to some embodiments of the disclosed technologies.

During an accident, the fire hydrant 300 will break away at the breakoff bolts 126, at the breakoff collar 120, or both. When this occurs, the lockout plate 119 and the activation rod 122 will follow. Without the pressure of the activation rod 122, the springs 306 will urge the slide 314 upwards, freeing the pedals 312 from the retention tabs 204. The flowing water will force the pedals 312 against the valve seat 406, thereby shutting off the flow of water.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An apparatus comprising:
   a valve body having a flange, a lockout bar, and a valve seat;
   a valve pedal configured to engage the valve seat and prevent fluid flow through the valve seat in a closed position, and to permit fluid flow through the valve seat in an open position;
   a saddle fixedly coupled to the flange;
   a lockout tab disposed on the saddle, wherein the lockout tab maintains the valve pedal in the open position;
   an activation rod mechanically coupled to the lockout bar and configured to keep the valve pedal engaged with the lockout tab;
   a valve slide slidably mounted to the saddle, wherein the valve pedal is pivotally mounted to the valve slide, and wherein the activation rod is configured to press the valve slide toward the lockout tab; and
   a spring configured to urge the valve slide away from the lockout tab.

2. The apparatus of claim 1, wherein the valve body is configured to be disposed within a fluid supply pipe, and the flange is configured to mate with a flange of the fluid supply pipe.

3. The apparatus of claim 1, wherein when the activation rod is not present, the valve pedal disengages from the lockout tab, and a flow of fluid passing the valve pedal moves the valve pedal from the open position to the closed position.

4. The apparatus of claim 1, further comprising:
   a second spring configured to urge the valve pedal away from the lockout tab;
   wherein, when the activation rod is not present, the spring causes the valve pedal to disengage from the lockout tab, and a flow of fluid passing the valve pedal moves the valve pedal from the open position to the closed position.

5. The apparatus of claim 1, further comprising:
   a collar disposed between the lockout bar and the valve body.

6. The apparatus of claim 5, wherein the collar is a breakaway collar.

7. The apparatus of claim 5, further comprising:
   a hydrant, wherein the collar is secured to the hydrant by a breakaway collar.

8. The apparatus of claim 1, further comprising:
   a bottom saddle comprising the lockout tab, wherein the bottom saddle is fixedly mounted within the valve body.

9. The apparatus of claim 1, further comprising:
   a lockout ring disposed distally from the valve body, the lockout ring comprising the lockout bar.

10. The apparatus of claim 1, further comprising:
    a second spring configured to urge the valve pedal from the open position toward the closed position.

11. An apparatus comprising:
    a valve body having a flange, a lockout bar, and a valve seat;
    a valve pedal configured to engage the valve seat and prevent fluid flow through the valve seat in a closed position, and to permit fluid flow through the valve seat in an open position;
    a saddle fixedly coupled to the flange, wherein the saddle is configured to be disposed within a riser, and the flange is configured to mate with a flange of the riser;
    a lockout tab disposed on the saddle, wherein the lockout tab maintains the valve pedal in the open position; and
    an activation rod mechanically coupled to the lockout bar and configured to keep the valve pedal engaged with the lockout tab.

12. The apparatus of claim 11, wherein the flange is further configured to mate with a flange of a hydrant.

13. The apparatus of claim 11, wherein when the activation rod is not present, the valve pedal disengages from the lockout tab, and a flow of fluid passing the valve pedal moves the valve pedal from the open position to the closed position.

14. The apparatus of claim 11, further comprising:
    a spring configured to urge the valve pedal away from the lockout tab;
    wherein, when the activation rod is not present, the spring causes the valve pedal to disengage from the lockout tab, and a flow of fluid passing the valve pedal moves the valve pedal from the open position to the closed position.

15. The apparatus of claim 11, further comprising:
    a collar disposed between the lockout bar and the valve body.

16. The apparatus of claim 15, wherein the collar is a breakaway collar.

17. The apparatus of claim 15, further comprising:
    a hydrant, wherein the collar is secured to the hydrant by a breakaway collar.

18. The apparatus of claim 11, further comprising:
    a valve slide slidably mounted within the valve body, wherein the valve pedal is pivotally mounted to the valve slide, and wherein the activation rod is configured to press the slide toward the lockout tab; and
    a spring configured to urge the valve slide away from the lockout tab.

19. The apparatus of claim 11, further comprising:
    a bottom saddle comprising the lockout tab, wherein the bottom saddle is fixedly mounted within the valve body.

20. The apparatus of claim 11, further comprising:
    a lockout ring disposed distally from the valve body, the lockout ring comprising the lockout bar.

* * * * *